US008976681B2

(12) United States Patent
Ozawa et al.

(10) Patent No.: US 8,976,681 B2
(45) Date of Patent: Mar. 10, 2015

(54) NETWORK SYSTEM, NETWORK MANAGEMENT SERVER, AND OAM TEST METHOD

(75) Inventors: Yoji Ozawa, Tokyo (JP); Eri Kawai, Yokohama (JP); Akihiro Koizumi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 639 days.

(21) Appl. No.: 13/198,782

(22) Filed: Aug. 5, 2011

(65) Prior Publication Data

US 2012/0051263 A1    Mar. 1, 2012

(30) Foreign Application Priority Data

Aug. 31, 2010 (JP) ................................ 2010-193056

(51) Int. Cl.
*G01R 31/08* (2006.01)
*H04L 12/26* (2006.01)
*H04L 12/46* (2006.01)
*H04L 12/24* (2006.01)

(52) U.S. Cl.
CPC ............ *H04L 43/50* (2013.01); *H04L 12/2697* (2013.01); *H04L 12/4641* (2013.01); *H04L 41/12* (2013.01); *H04L 41/0213* (2013.01); *H04L 41/0893* (2013.01)

USPC ......... 370/241.1; 370/400; 370/389; 709/220

(58) Field of Classification Search
None
See application file for complete search history.

(56) References Cited

U.S. PATENT DOCUMENTS

| 6,947,547 B2* | 9/2005 | Cheung et al. ........... 379/399.01 |
| 8,264,970 B2* | 9/2012 | Mohan et al. ............... 370/241.1 |
| 8,605,603 B2* | 12/2013 | Hill et al. ........................ 370/248 |
| 8,626,883 B2* | 1/2014 | Kompella et al. ............. 709/222 |
| 2002/0172348 A1* | 11/2002 | Cheung et al. ................ 379/242 |
| 2004/0215758 A1* | 10/2004 | Kompella et al. ............. 709/223 |
| 2008/0219173 A1* | 9/2008 | Yoshida et al. ............. 370/241.1 |
| 2010/0228842 A1* | 9/2010 | Kompella et al. ............. 709/222 |

FOREIGN PATENT DOCUMENTS

| JP | 2004-32257 A | 1/2004 |
| JP | 2008-131614 A | 6/2008 |

* cited by examiner

*Primary Examiner* — Bob Phunkulh
(74) *Attorney, Agent, or Firm* — Crowell & Moring LLP

(57) ABSTRACT

A network system, management server, and OAM test management method for grouping the virtual networks, selecting a test target for each group, and lowering the network load and the operating load in the OAM testing. Grouping the multiple virtual networks based on their physical topology and selecting a representative virtual network for each group, allows selecting a test target virtual network from among the representative virtual networks for the virtual network selected by the operator and executing tests.

6 Claims, 32 Drawing Sheets

FIG. 3

| NETWORK DEVICE ID (5211) | PORT ID (5212) | PORT IDENTIFICATION INFORMATION (5213) | DOMAIN BORDER (5214) |
|---|---|---|---|
| 1 | 1 | 1.1 | ○ |
| 1 | 4 | 1.4 | – |
| 4 | 1 | 4.1 | – |
| 4 | 2 | 4.2 | – |
| 4 | 3 | 4.3 | ○ |
| ⋮ | | | |

FIG. 4

| NETWORK DEVICE ID (5221) | OWN PORT ID (5222) | ADJACENT PORT IDENTIFICATION INFORMATION (5223) |
|---|---|---|
| 1 | 4 | 3.2 |
| 2 | 4 | 4.2 |
| ⋮ | | |

FIG. 5

| LINK ID | EDGE NETWORK DEVICE 1 ID | EDGE NETWORK DEVICE 1 PORT ID | EDGE NETWORK DEVICE 2 ID | EDGE NETWORK DEVICE 2 PORT ID |
|---|---|---|---|---|
| 1 | 1 | 4 | 3 | 2 |
| 2 | 2 | 4 | 4 | 2 |
| 3 | 3 | 3 | 4 | 1 |
| 4 | 3 | 4 | 5 | 2 |
| 5 | 4 | 4 | 6 | 2 |
| : | : | : | : | : |

FIG. 6

| RING ID | COMPOSED NETWORK DEVICE | MASTER NODE ID | FORWARDING PORT ID | BLOCKING PORT ID | ASSIGNED VLAN ID |
|---|---|---|---|---|---|
| 1 | 3, 4, 6, 5 | 4 | 4 | 1 | 10, 11, 20 |
| 1 | 3, 4, 6, 5 | 4 | 1 | 4 | 30 |
| 2 | 5, 6, 8, 7 | 8 | 2 | 1 | 10, 11, 20, 30 |
| : | | | | | |

FIG. 7

| VLAN ID | COMPOSED NETWORK DEVICE (ASSIGNED VLAN ID) |
|---|---|
| 10 | 2(2, 4), 3(3, 4), 4(1, 2, 4), 5(1, 2, 3, 4), 6(1, 2, 3, 4), 7(2, 3), 8(1, 2, 4), 10(2) |
| 11 | 2(2, 4), 3(3, 4), 4(1, 2, 4), 5(1, 2, 3, 4), 6(1, 2, 3, 4) |
| 20 | 1(2, 4), 3(2, 3, 4), 4(1, 2, 4), 5(1, 2, 3, 4), 6(1, 2, 3, 4), 7(2, 3), 8(1, 2, 4), 10(2) |
| 30 | 2(2, 4), 3(3, 4), 4(1, 2, 4), 5(1, 2, 3, 4), 6(1, 2, 3, 4), 7(2, 3), 8(1, 2, 4), 10(2) |
| : | |

FIG. 8

| GROUP ID | TEST TARGET VLAN ID | GROUP MEMBER VLAN ID | MA ID |
|---|---|---|---|
| 1 | 10 | 11, 12, 13 | 1 |
| 2 | 20 | 21, 22 | 2 |
| 3 | 30 | 31, 32 | 3 |
| : | | | |

FIG. 9

| MA ID | NETWORK DEVICE ID | PORT ID | MEP ID |
|---|---|---|---|
| 1 | 4 | 3 | 1401 |
| 1 | 5 | 1 | 1501 |
| 2 | 4 | 3 | 2401 |
| ⋮ | | | |

| LOG ID | GENERATION TIME | TARGET VLAN | RESULT | TESTED VLAN ID |
|---|---|---|---|---|
| 1 | 2010-01-29 01:11:22 | 10 | DETECTED FAILURE (PERIODIC TEST) | 10 |
| 2 | 2010-01-29 01:11:22 | 11 | DETECTED FAILURE (PERIODIC TEST) | 10 |
| 3 | 2010-01-29 01:14:33 | 21 | OK | 20 |
| 4 | 2010-01-29 01:14:33 | 20 | OK | 20 |
| 5 | 2010-01-29 01:25:44 | 30 | NG | 30 |
| 6 | 2010-01-29 01:25:44 | 32 | NG | 30 |
| ⋮ | | | | |

| PORT ID (1211) | PORT IDENTIFICATION INFORMATION (1212) |
|---|---|
| 1 | 4.1 |
| 2 | 4.2 |
| 3 | 4.3 |
| : | |

FIG. 13

| PORT ID (1221) | ADJACENT PORT IDENTIFICATION INFORMATION (1222) |
|---|---|
| 1 | 3.3 |
| 2 | 2.4 |
| 4 | 6.2 |
| : | |

FIG. 14

| RING ID (1231) | MASTER NODE (1232) | FORWARDING PORT ID (1233) | BLOCKING PORT ID (1234) | ASSIGNED VLAN ID (1235) |
|---|---|---|---|---|
| 1 | YES | 4 | 1 | 10, 11, 20 |
| 1 | YES | 1 | 4 | 30 |
| ⋮ | | | | |

FIG. 15

| VLAN ID (1241) | ASSIGNED VLAN ID (1242) |
|---|---|
| 10 | 1, 2, 4 |
| 11 | 1, 2, 4 |
| 20 | 1, 2, 4 |
| ⋮ | |

FIG. 16

| MA ID (1251) | TEST TARGET VLAN (1252) | MEP ID (SET PORT ID) (1253) |
|---|---|---|
| 1 | 10 | 1401 (3) |
| 2 | 20 | 2401 (3) |
| 3 | 30 | 3401 (3) |
| : | | |

FIG. 17

| TEST EXECUTION TIME (1261) | TARGET MA (1262) | REMOTE MEP ID (1263) | RESULT (1264) |
|---|---|---|---|
| 2010-01-29 01:11:15 | 1 | 1501 | OK |
| 2010-01-29 01:11:15 | 2 | 1601 | OK |
| 2010-01-29 01:11:20 | 1 | 1501 | NG |
| : | | | |

FIG. 18

| FAILURE OCCURRED | | |
|---|---|---|
| FAILURE OCCUR TIME: 2010-01-29 1:11:22 | | |
| IMPACTED VLAN: | VLAN ID | CUSTOMER |
| | 10 | A |
| | 11 | B |
| | 20 | C |
| | : | : |
| | OK | |

FIG. 19

| TEST EXECUTION |

SELECT TEST TARGET VLAN AND TEST POINTS.
  YOU CAN SELECT TEST POINTS WITH INPUTTING ON TEXT BOX
  OR CLICKING PORT ON MAP.

TEST TARGET VLAN:

| VLAN ID |
|---------|
| 10 |
| 11 |
| 20 |
| : |

TEST POINT (SOURCE)　　NETWORK DEVICE ID: 2　　PORT ID: 2

TEST POINT (DESTINATION)　NETWORK DEVICE ID: 5　　PORT ID: 1

TEST

FIG. 21

| TEST LOG | | | |
|---|---|---|---|
| LOG ID | GENERATION TIME | TARGET VLAN | RESULT |
| 1 | 2010-01-29 01:11:22 | 10 | DETECTED FAILURE (PERIODIC TEST) |
| 2 | 2010-01-29 01:11:22 | 11 | DETECTED FAILURE (PERIODIC TEST) |
| 3 | 2010-01-29 01:14:33 | 21 | OK |
| 4 | 2010-01-29 01:14:33 | 20 | OK |
| 5 | 2010-01-29 01:25:44 | 30 | NG |
| 6 | 2010-01-29 01:25:44 | 32 | NG |
| ⋮ | | | |

| MESSAGE | SOURCE | DESTINATION | RESULT | |
|---|---|---|---|---|
| REQUEST FOR DEVICE INFORMATION | MANAGEMENT SERVER | NETWORK DEVICE | · REQUEST FOR DEVICE INFORMATION SEND | S101 |
| CONFIGURATION DATA | NETWORK DEVICE | MANAGEMENT SERVER | · PORT TABLE<br>· PHYSICAL CONNECTION TABLE<br>· RING TABLE<br>· VLAN TABLE | S102 |
| REQUEST FOR CONFIGURATION | MANAGEMENT SERVER | NETWORK DEVICE | · OAM COMPOSITION TABLE<br>(MA ID, TEST TARGET VLAN, MEP TABLE) | S106 |
| CONFIGURATION RESULT | NETWORK DEVICE | MANAGEMENT SERVER | · CONFIGURATION RESULT | S107 |

FIG. 27

| MESSAGE | SOURCE | DESTINATION | RESULT |
|---|---|---|---|
| NOTIFICATION OF MODIFICATION OF VLAN | MANAGEMENT TERMINAL | MANAGEMENT SERVER | · MODIFIED SWITCH<br>· MODIFIED VLAN ID<br>· MODIFICATION TYPE (ADD, DELETE, MODIFY) |

| MESSAGE | SOURCE | DESTINATION | RESULT | |
|---|---|---|---|---|
| PERIODIC TEST | NETWORK DEVICE | NETWORK DEVICE | · PERIODIC TEST DATA | ~S501 |
| NOTIFICATION OF FAILURE | NETWORK DEVICE | MANAGEMENT SERVER | · SOURCE NETWORK DEVICE ID<br>· MA ID<br>· DESTINATION OF FAILED TEST | ~S504 |
| NOTIFICATION OF FAILURE | MANAGEMENT SERVER | MANAGEMENT TERMINAL | · VLAN OF FAILED TEST<br>· FAILURE TIME | ~S507 |

FIG. 33

| MESSAGE | SOURCE | DESTINATION | RESULT | |
|---|---|---|---|---|
| REQUEST FOR TEST CONDITION | MANAGEMENT TERMINAL | MANAGEMENT SERVER | — | ~S601 |
| TEST CONDITION | MANAGEMENT SERVER | MANAGEMENT TERMINAL | · VLAN LIST<br>· PHYSICAL TOPOLOGY | ~S602 |
| REQUEST FOR TEST EXECUTION | MANAGEMENT TERMINAL | MANAGEMENT SERVER | · TARGET VLAN ID<br>· TEST POINT | ~S604 |
| REQUEST FOR TEST EXECUTION | MANAGEMENT SERVER | NETWORK DEVICE | · MA ID<br>· DESTINATION MEP ID | ~S606 |
| TEST EXECUTION | NETWORK DEVICE | NETWORK DEVICE | · TEST DATA | ~S607 |
| RESPONSE | NETWORK DEVICE | NETWORK DEVICE | · RESPONSE FOR TEST FRAME | ~S608 |
| TEST RESULT (SUCCESS) | NETWORK DEVICE | MANAGEMENT SERVER | · TEST RESULT<br>· PATH<br>· TEST CONDITION (TARGET VLAN, TEST POINT) | ~S609 |
| TEST RESULT (FAILURE) | NETWORK DEVICE | MANAGEMENT SERVER | · TEST RESULT<br>· PATH<br>· TEST CONDITION (TARGET VLAN, TEST POINT) | ~S614 |
| TEST RESULT | MANAGEMENT SERVER | MANAGEMENT TERMINAL | · TEST RESULT<br>(TEST RESULT, ............ TARGET VLAN) | ~S612 |
| NOTIFICATION OF FAILURE | MANAGEMENT SERVER | MANAGEMENT TERMINAL | · VLAN OF FAILED TEST<br>· FAILURE TIME | ~S616 |

FIG. 35

| OAM COMPOSITION CHECK RESULTS | | |
|---|---|---|

THE FOLLOWING VLAN CANNOT BE TESTED.
CLICK THE "AUTO SET" BUTTON TO SET THE OAM TO ALLOW TESTING.

| VLAN ID |
|---|
| 101 |
| 201 |
| : |

[ CLOSE ]   [ AUTO SET ]

THE FOLLOWING SCREEN APPEARS IF THE "AUTO SET" BUTTON WAS CLICKED.

| OAM COMPOSITION AUTO SET | | |
|---|---|---|

SET THE OAM COMPOSITION TO ALLOW TESTING ALL THE VLAN.

[✓] MINIMIZE NUMBER OF TEST TARGET VLAN.
(SELECTING THIS OPTION MIGHT MODIFY THE CURRENTLY USED MA.)

[ SET ]   [ CANCEL ]

FIG. 37

| MESSAGE | SOURCE | DESTINATION | RESULT | |
|---|---|---|---|---|
| REQUEST FOR DEVICE INFORMATION | MANAGEMENT SERVER | NETWORK DEVICE | · REQUEST FOR DEVICE INFORMATION SEND | S701 |
| CONFIGURATION DATA | NETWORK DEVICE | MANAGEMENT SERVER | · PORT TABLE<br>· PHYSICAL CONNECTION TABLE<br>· RING TABLE<br>· VLAN TABLE<br>· OAM COMPOSITION TABLE | S702 |
| CHECK RESULT | MANAGEMENT SERVER | MANAGEMENT TERMINAL | · TEST AVAILABILITY<br>· TEST DISABLE VLAN LIST | S706 |
| REQUEST FOR OAM COMPOSITION | MANAGEMENT TERMINAL | MANAGEMENT SERVER | · FLAG OF CHANGING EXISTING OAM CONFIGURATION | S708 |

NETWORK SYSTEM, NETWORK MANAGEMENT SERVER, AND OAM TEST METHOD

CLAIM OF PRIORITY

The present invention claims priority from Japanese Patent Application JP 2010-193056 filed on Aug. 31, 2010, the content of which is hereby incorporated by reference into this application.

FIELD OF THE INVENTION

The present invention relates to a network system, a management server and an OAM test method, and relates in particular to a network system, a management server, and an OAM test method for managing information, test support, and managing test results for implementing virtual network testing of VLAN, etc.

BACKGROUND OF THE INVENTION

Wide area Ethernet (also called Metro Ethernet) services are becoming extensively used in recent years as services for connecting business or other operation centers that are dispersed over wide areas. Ethernet was originally a LAN-oriented technology but factors such as cheap equipment costs have led to studies on applications to wide-area networks. However one issue in applying Ethernet to wide-area networks is reliability. Ethernet OAM (Operations, Administration, Maintenance) technology was developed and standards established for maintaining a high level of reliability. Ethernet OAM technology is an accepted part of wide area networks used by telecommunications carriers and is starting to become widely used in corporate networks and elsewhere where reliability is essential.

Ethernet OAM is technology for sending a test frame along the same communication path as the user data and making continuity tests or performance tests. In wide-band Ethernet a VLAN is allotted to each user. A test frame is sent along the VLAN and making tests along the same communication path allows testing performance and accurate trouble assessment. The tests are executed at a periodic timing or made at a timing that is allowable to the user.

Utilizing Ethernet OAM also requires making Ethernet OAM settings in the network device. More specifically the following settings are needed.

The MA (Maintenance Association) is the test management range for making OAM tests within the MA. The MA requires a VLAN (virtual network) for sending a test frame in each MA.

The MEP (Maintenance Association End Point) is the management point at the boundaries of the MA. Testing is carried out between two MEP.

The method disclosed in Japanese Unexamined Patent Application Publication No. 2008-131614 provides a network device for processing Ethernet OAM frames. However, operating Ethernet OAM requires making Ethernet OAM settings in the network device.

SUMMARY OF THE INVENTION

A wide-area network service is configured from multiple virtual networks (VLAN) for each user on a physical network. A problem with wide-area network service is that monitoring and testing all of these virtual networks poses a large load on the network and a large work load (operating load) on the provider.

Network loads and operating loads are described next in detail. A first network load is the load imposed by the network device. During periodic testing, the network device must perform processing for failure detection and for sending and receiving test frames on a scale that matches the number of virtual networks. This processing load therefore increases in proportion to the number of virtual networks.

The network device also retains the MEP ID and test results within the MA. Therefore the amount of memory required for storing this information increases in proportion to the number of virtual networks.

A second network load is the increase in frames for OAM. Sending test frames along the test target virtual network results in an increased volume of traffic proportional to the number of virtual networks.

Operating loads are described next. Implementing Ethernet OAM requires designing and setting the correct parameters for each network device. These settings must be made on a scale matching the number of test target virtual networks. So if there are a large number of virtual networks, then the work load imposed by designing and setting those parameters will be extremely large.

In order to address the aforementioned problems, the present invention limits the test target virtual networks, by sorting the virtual networks into groups, and selects a test target virtual network for testing from those groups.

The method disclosed in Japanese Unexamined Patent Application Publication No. 2004-32257 groups the VLAN in order to lower the number of spanning tree communication packets and processing. However, this method has the following problems. One problem is that this method is not designed for OAM. The method disclosed in Japanese Unexamined Patent Application Publication No. 2004-32257 is a spanning tree oriented method and so cannot reduce Ethernet OAM operating loads and the network loads.

To address the aforementioned problems, the present invention reduces the network load and operates load in networks comprised of multiple virtual networks.

According to an aspect of the present invention to address the aforementioned problems, there is provided a network system including:
multiple transfer devices that transfers packets;
a management server that manages the network comprised of the applicable multiple transfer devices,
in which the management server is comprised of an interface that acquires network configuration data from the transfer devices, a memory unit that stores the configuration data, and a control unit, generating virtual network information based on the configuration data, sorting the virtual networks into groups based on the transfer devices that configure the applicable virtual networks, and topology information for the transfer devices that configure the applicable virtual networks, selecting one virtual network from each of the groups, and setting the selected virtual network as the virtual network for testing in the group in which the applicable selected network belongs.

According to another aspect of the present invention, there is provided a management server for managing a network comprised of multiple transfer devices for transferring packets, including:
an interface that acquires network configuration data from the transfer devices;
a memory unit that stores the configuration data;

a control unit that generates virtual network information based on the configuration data, sorting the virtual networks into groups based on the transfer devices that configure the applicable virtual networks, and topology information for the transfer devices that configure the applicable virtual networks, selecting one virtual network from the groups, and setting the selected virtual network as the virtual network for testing in the group in which the applicable selected network belongs.

According to still another aspect of the invention, there is provided a management method for a management server that manages a network comprised of multiple transfer devices for transferring packets, and the method includes:

the management server acquiring network configuration data from the transfer devices; and generating virtual network information based on the configuration data by using a control unit;

sorting the virtual networks into groups based on the transfer devices that configure the applicable virtual networks, and topology information for the transfer devices that configure the applicable virtual networks;

selecting one virtual network from each of the groups; and setting the selected virtual network as the test target virtual network in the group in which the applicable selected network belongs.

The present invention therefore renders a network system configured from numerous virtual networks and capable of reducing the network load and operating load by limiting the number of test target virtual networks.

In other words, when a failure occurs one network can be tested in place of other networks to efficiently specify the impact range of the failure and lower the operating load. The present invention can moreover reduce the number of test frames and lower the processing load imposed by network devices.

An example shown here utilizes a specific traffic volume. A single frame for periodic testing has a size of 64 bytes. Setting the number of VLAN to 32,000 and the number of network devices for periodic testing to 100, and the test interval to 1 second when all VLAN are tested, will give a total volume of incoming receive traffic of (74 bytes×32,000 VLAN×100 devices)/1 second=236 Mbps.

On the other hand by grouping the VLAN, and setting the number of test target VLAN to 10, then the total volume of incoming receive traffic will be drastically reduced to: (74 bytes×10 VLAN×100 devices)/1 second=0.074 Mbps.

BRIEF DESCRIPTION OF THE DRAWINGS

FIG. 3 is a drawing for describing the port table 521 of the first embodiment;

FIG. 4 is a drawing for describing the physical connection table 522 of the first embodiment;

FIG. 5 is a drawing for describing the physical topology table 523 of the first embodiment;

FIG. 6 is a drawing for describing the network-level ring table 524 of the first embodiment;

FIG. 7 is a drawing for describing the network-level VLAN table 525 of the first embodiment;

FIG. 8 is a drawing for describing the VLAN group/MA table 526 of the first embodiment;

FIG. 9 is a drawing for describing the OAM composition table 527 of the first embodiment;

FIG. 10 is a drawing for describing the log table 528 of the first embodiment;

FIG. 12 is a drawing for describing the port table 121 of the first embodiment;

FIG. 13 is a drawing for describing the physical connection table 122 of the first embodiment;

FIG. 14 is a drawing for describing the ring table 123 of the first embodiment;

FIG. 15 is a drawing for describing the VLAN table 124 of the first embodiment;

FIG. 16 is a drawing for describing the OAM composition table 125 of the first embodiment;

FIG. 17 is a drawing for describing the periodic test result table 126 of the first embodiment;

FIG. 18 is a drawing for describing the user interface for notification of failure on the management terminal 700 of the first embodiment;

FIG. 19 is a drawing for describing the user interface for setting test conditions on the management terminal 700 of the first embodiment;

FIG. 21 is a drawing for describing the user interface for displaying logs on the management terminal 700 of the first embodiment;

FIG. 23 is a drawing for describing the messages sent and received for the OAM composition design and setting processing in the first embodiment;

FIG. 27 is a drawing for describing the messages sent and received in the OAM composition redesign process when modifying the VLAN in the first embodiment;

FIG. 31 is a table showing the messages sent and received in the periodic testing process of the first embodiment;

FIG. 33 is a drawing for describing the messages sent and received at testing during the operator command in the first embodiment;

FIG. 35 is a drawing for describing the user interface for requesting settings and check results of the OAM composition on the management terminal 700 of the second embodiment;

FIG. 37 is a drawing for describing the messages sent and received in check processing of the OAM composition in the second embodiment;

DETAILED DESCRIPTION OF THE PREFERRED EMBODIMENTS

Figure 1:
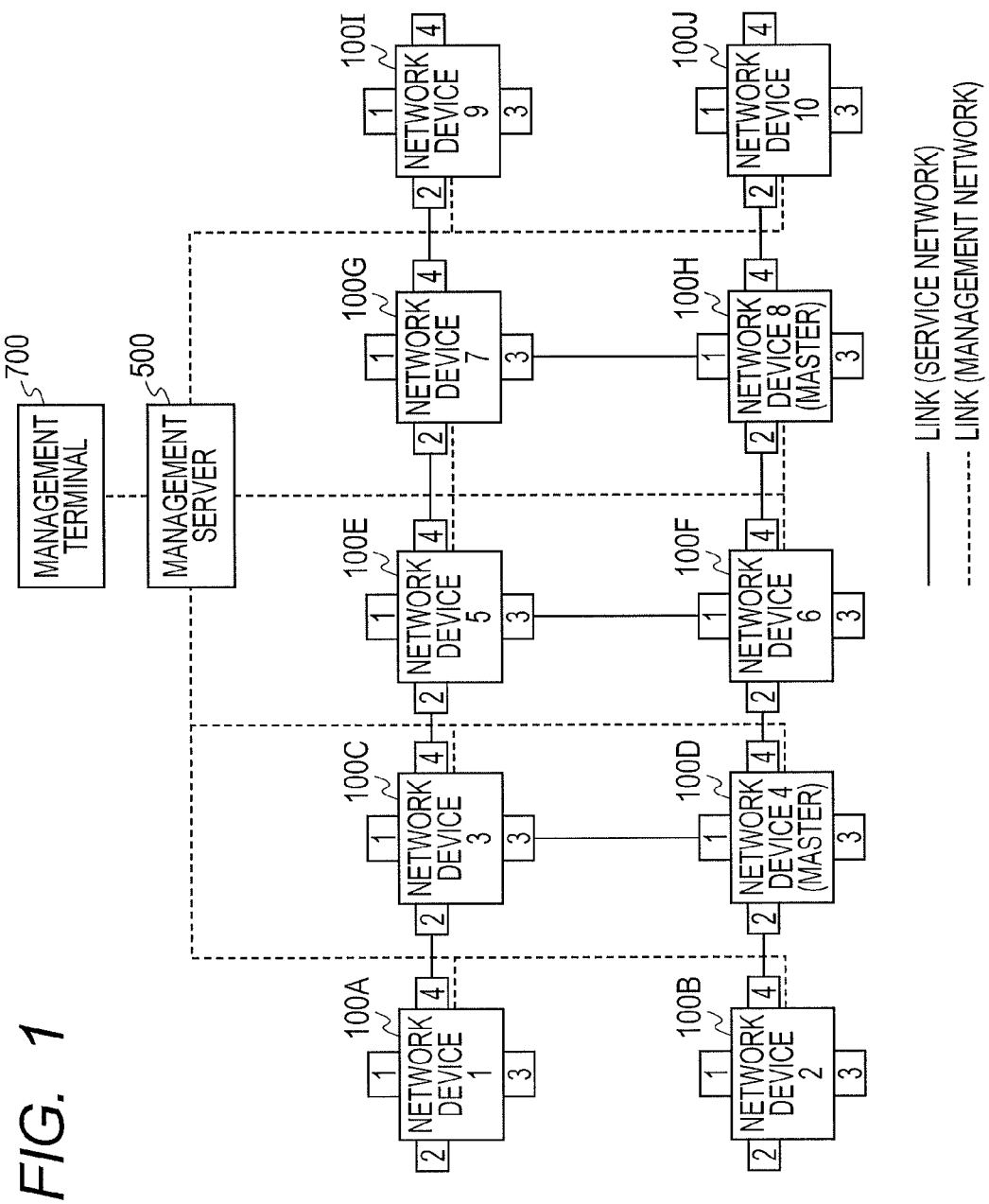
FIG. 1 is a block diagram showing the structure of the network system of a first embodiment.

The embodiments of the present invention are described next while referring to the drawings.

EXAMPLE 1

FIG. 1 is a block diagram showing the structure of the network system of a first embodiment. The network system of this embodiment is comprised for example of the network devices (transfer device) 100A through 100J, a management server 500, and a management terminal (system provider management terminal) 700. In the following description, the network devices 100A through 100J are sometimes called by the collective name network device 100. The management server 500 is a computer for managing the network device 100. The management server 500 can communicate with the network device 100, gather configuration data, and make settings on the network device 100. In FIG. 1, the management server 500 and the network device 100 are physically coupled by a separate network (described as dotted lines) but may be coupled by way of a service network (described as solid lines). The management server 500 is described in detail later on while referring to FIG. 2. The network device 100 is a device for transferring table conveyed within a network to a destination and is for example a switch, router, or a transmission device. The management terminal 700 is for example coupled to the management server 500. The network device 100 is not limited to the example disclosed in the drawing and may be provided in a quantity as needed.

A virtual network is configured on the network devices 100. The virtual network is described as a VLAN in this embodiment but technology for implementing virtual networks other than VLAN such as MPLS may be employed.

Figure 2:
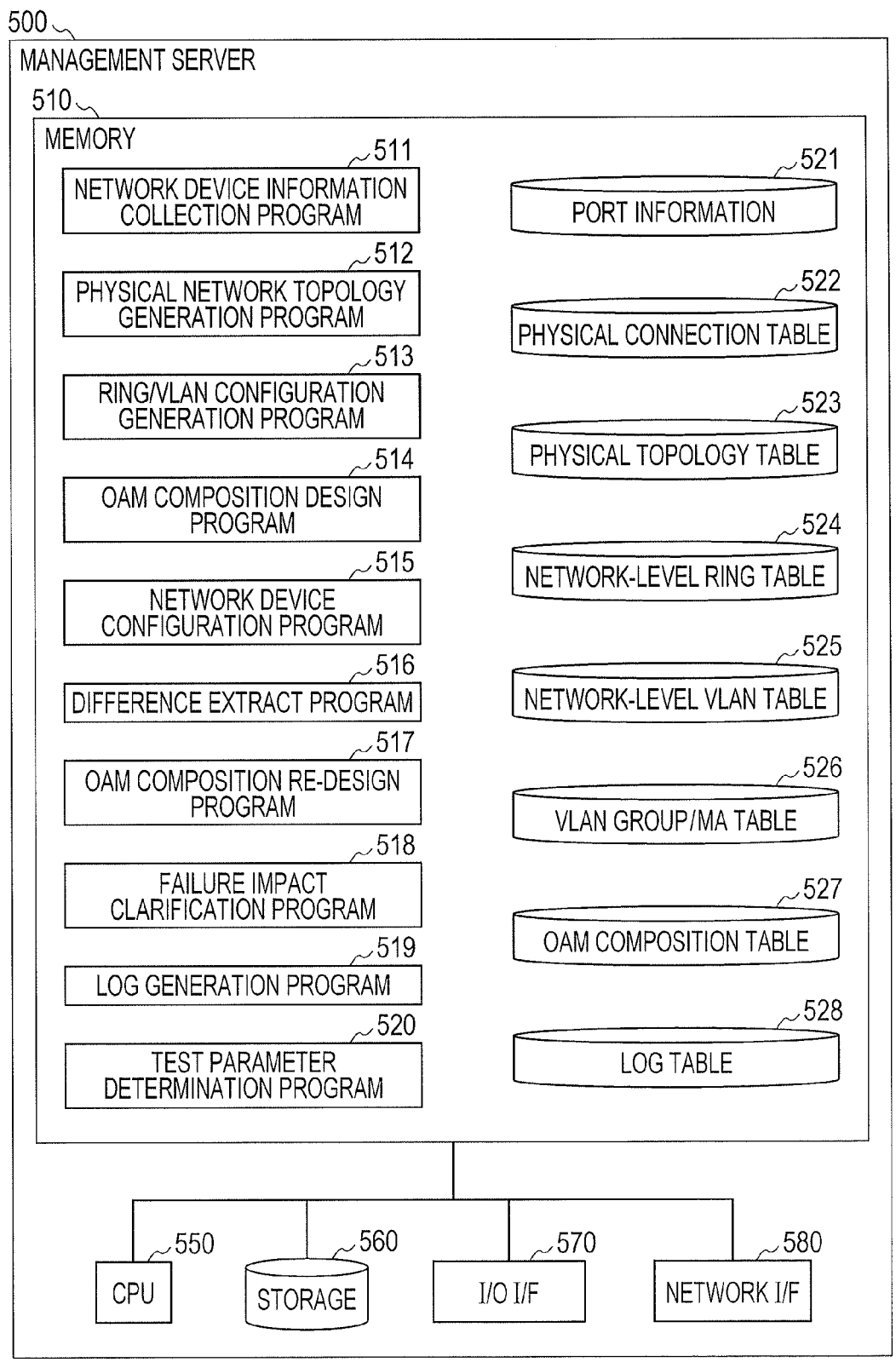
FIG. 2 is a block diagram of the management server 500 of the first embodiment.

FIG. 2 is a block diagram of the management server 500 of this embodiment. The management server 500 is comprised for example of a memory 510, a processing unit (CPU) 550, a storage unit 560, an I/O interface (I/F) 570 and a network interface (I/F) 580. The management server 500 sends and receives information by way of the network I/F 580 to other devices (network device 100, etc.) connected to the network.

The memory 510 stores for example the network device information collection program 511, the physical network topology generation program 512, the ring/VLAN configuration generation program 513, the OAM composition design program 514, the network device configuration program 515, the difference extract program 516, the OAM composition redesign program 517, the failure impact clarification program 518, the log generation program 519, the test parameter determination program 520, the port table 521, the physical connection table 522, the physical topology table 523, the network-level ring table 524, the network-level VLAN table 525, the VLAN group/MA table 526, the OAM composition table 527, and the log table 528. The CPU 550 executes each program.

The network device information collection program 511 collects the port table, the physical connection table, the ring table, the VLAN table, and the OAM composition table, and so on from the network device 100. The physical network topology generation program 512 generates the physical topology from the collected information. The ring/VLAN configuration generation program 513 generates the ring table and the VLAN table from the collected information. The OAM composition design program 514 does the grouping of the VLAN, selects the test target VLAN, and generates the information for setting the OAM in order to perform the VLAN testing. The network device configuration program 515 sets the information generated by the OAM composition design program 514 in the network device 100. The difference extract program 516 extracts the differential between the previous configuration and the present configuration during the modification of the VLAN configuration. The OAM composition redesign program 517 once again designs the OAM configuration during the changing of the VLAN configuration. The failure impact clarification program 518 specifies the VLAN affected by a failure that was detected as a failure in the test results. The log generation program 519 generates a log of the test results. The test parameter determination program 520 sets the test parameters according to the input information from the user during operation.

The port table 521 manages the network device 100 port information. The port table 521 is described in detail later on while referring to FIG. 3. The physical connection table 522 manages the physical connection information between the ports. The physical connection table 522 is described in detail later on while referring to FIG. 4. The physical topology table 523 manages the configuration data for the physical topology. The physical topology table 523 is described later on in detail while referring to FIG. 5. The network-level ring table 524 manages the configuration data for the network-level ring and not the individual devices. The network-level ring table 524 is described in detail later on while referring to FIG. 6. The network-level VLAN table 525 manages the configuration data of the network-level VLAN and not the individual devices. The network-level VLAN table 525 is described in detail later on while referring to FIG. 7. The VLAN group/MA table 526 manages information for the MA corresponding to the VLAN group. The VLAN group/MA table 526 is described in detail later on while referring to FIG. 8. The OAM composition table 527 manages the MEP ID and the port for setting the MA and the MEP for that MA. The OAM composition table 527 is described later on in detail while referring to FIG. 9. The log table 528 manages the test result log information. The log table 528 is described later on while referring to FIG. 10.

The CPU 550 is a processor for executing each of the programs stored in the memory 510. The storage unit 560 is a device capable of storing the program and each type of data and for example may be comprised of a HDD. The I/O I/F 570 is an interface for inputting and outputting data. The network I/F 580 is an interface for sending and receiving information to and from other network devices 100 connected to the network.

FIG. 3 is a drawing for describing the port table 521 of this embodiment. The port table 521 for example contains the network device ID 5211, the port ID 5212, the port identification information 5213, and the domain border 5214. The network device ID 5211 is information for specifying the network device 100. The port ID 5212 is information for specifying a port in one of the network devices 100. The port identification information 5213 is information for specifying a port in all of the network devices 100. The domain border 5214 is information for showing whether or not the applicable port is the border of the domain. This domain border 5214 is used when selecting the target port for setting the MEP. The user manually inputs the domain border 5214. The user can judge the border from the network configuration (border of port with different VLAN configuration technology).

FIG. 4 is a drawing for describing the physical connection table 522 of this embodiment. This physical connection table 522 for example contains a network device ID 5221, an own port ID 5222, and an adjacent port identification information 5223. The network device ID 5221 is information for specifying the network device 100. The own port ID 5222 is one end of the physical connection, and is information for specifying the network device 100 port of network device ID 5221. The adjacent port identification information 5223 is information for specifying the port corresponding to the port using the own port ID 5222.

FIG. 5 is a drawing for describing the physical topology table 523 of this embodiment. The physical topology table 523 for example contains a link ID 5231, an edge network device 1 ID 5232, an edge network device 1 port ID 5233, an edge network 2 ID 5234, and an edge network device 2 port ID 5235. The physical topology table expresses the link cluster between two ports. The link ID 5231 is information for specifying the link. The edge network device 1 ID 5232 is information for specifying the network device 100 possessing one end port of the link. The edge network device 1 port ID 5233 is information for specifying one end port of the link. The edge network device 2 ID 5234 is information for specifying the network device 100 possessing a port corresponding to the edge network device 1 port ID 5233. The edge network device 2 port ID 5235 is information for specifying the port corresponding to the edge network device 1 port ID 5233.

FIG. 6 is a drawing for describing the network-level ring table 524 of this embodiment. The network-level ring table 524 contains for example, a ring ID 5241, a composed network device 5242, a master node ID 5243, a forwarding port ID 5244, a blocking port ID 5245, and an assigned VLAN ID 5246. The ring ID 5241 is information for specifying the ring. The composed network device 5242 is information for specifying the multiple network devices 100 of which the ring is comprised. The master node ID 5243 is information for specifying the network device 100 within the ring performing path switching and testing of the ring status. The forwarding port ID 5244 is information for specifying the port to use during normal transfers, and is for ports configuring the master node ring. The blocking port ID 5245 is information for specifying ports not used during normal transfer, and is for ports configuring the master node ring. The assigned VLAN ID 5246 is information for specifying the VLAN assigned to the ring.

FIG. 7 is a drawing for describing the network-level VLAN table 525 of this embodiment. The network-level VLAN table 525 contains for example the VLAN ID 5251, and the composed network device (assigned VLAN ID) 5252. The VLAN ID 5251 is information for specifying the VLAN. The composed network device (assigned VLAN ID) 5252 is the network device ID assigned by the VLAN of VLAN ID 5251 and is the port ID for that network device. The port ID is described in brackets. In the second entry in FIG. 7 for example, the (VLAN ID: "11", composed network device 100: "2(2,4), 3(3,4), 4(1,2,4), 5(1,2,3,4), 6(1,2,3,4)") indicates that the VLAN ID is 11 under the VLAN heading, and that ports 2, 4 are assigned to the network device 2, ports 3, 4 are assigned to the network device 3, ports 1, 2, 4 are assigned to the network device 4, ports 1, 2, 3, 4 are assigned to the network device 5, and ports 1, 2, 3, 4 are assigned to the network device 6.

FIG. 8 is a drawing for describing the VLAN group/MA table 526 of this embodiment. The VLAN group/MA table 526 contains for example the group ID 5261, the test target VLAN ID 5262, the group member VLAN ID 5263, and the MA ID 5264. The group ID 5261 is information for specifying the VLAN group. The test target VLAN ID 5262 is information for specifying the test object VLAN within the VLAN group. The group member VLAN ID 5263 is ID for one or multiple VLAN belonging to the group. The MA ID 5264 is information for specifying the MA set in the test target VLAN.

FIG. 9 is a drawing for describing the OAM composition table 527 of this embodiment. The OAM composition table 527 contains for example the MA ID 5271, the network device ID 5272, the port ID 5273 and the MEP ID 5274. The MA ID 5271 is an ID for specifying the MA. The network device ID 5272 is information for specifying the network device 100 that the MEP is set. The port ID 5273 is an ID for specifying the port that the MEP is set. The MEP ID 5274 is information for specifying the MEP, and is information for setting in the network device.

FIG. 10 is a drawing for describing the log table 528 of this embodiment. The log table 528 contains for example the log ID 5281, the generation time 5282, the target VLAN 5283, the result 5284, and the tested VLAN ID 5285. The log ID 5281 is information for specifying the log. The generation time 5282 is the time when the log is generated. The target VLAN 5283 is the VLAN that was affected, per results of the tests that were implemented. The results 5284 are the test types and the test results. If the periodic testing for example detected a failure then the result become "Detected Failure (periodic test)." If the user command test was successful then "OK" and if a fail then "NG" are the results. The tested VLAN ID 5285 is the VLAN where the actual test frame was sent. In other words, the tested VLAN ID 5285 is the VLAN set as the test target VLAN ID 5262. For example, the second entry in FIG. 10 indicates that a periodic test of the VLAN having the ID 10 was made at 1 o'clock 11 minutes 22 seconds on Jan. 29, 2010, and that a failure was detected in those test results, and the there was even a failure in the VLAN having ID 11.

The log that is generated contains multiple test results for the VLAN that was actually tested. The first and second entries for example contain results generated from one test of the VLAN having the ID 10 (target VLAN). In other words, multiple VLAN can be tested in one test so that the test traffic can be reduced and the load on the network device can be lowered.

Figure 11:
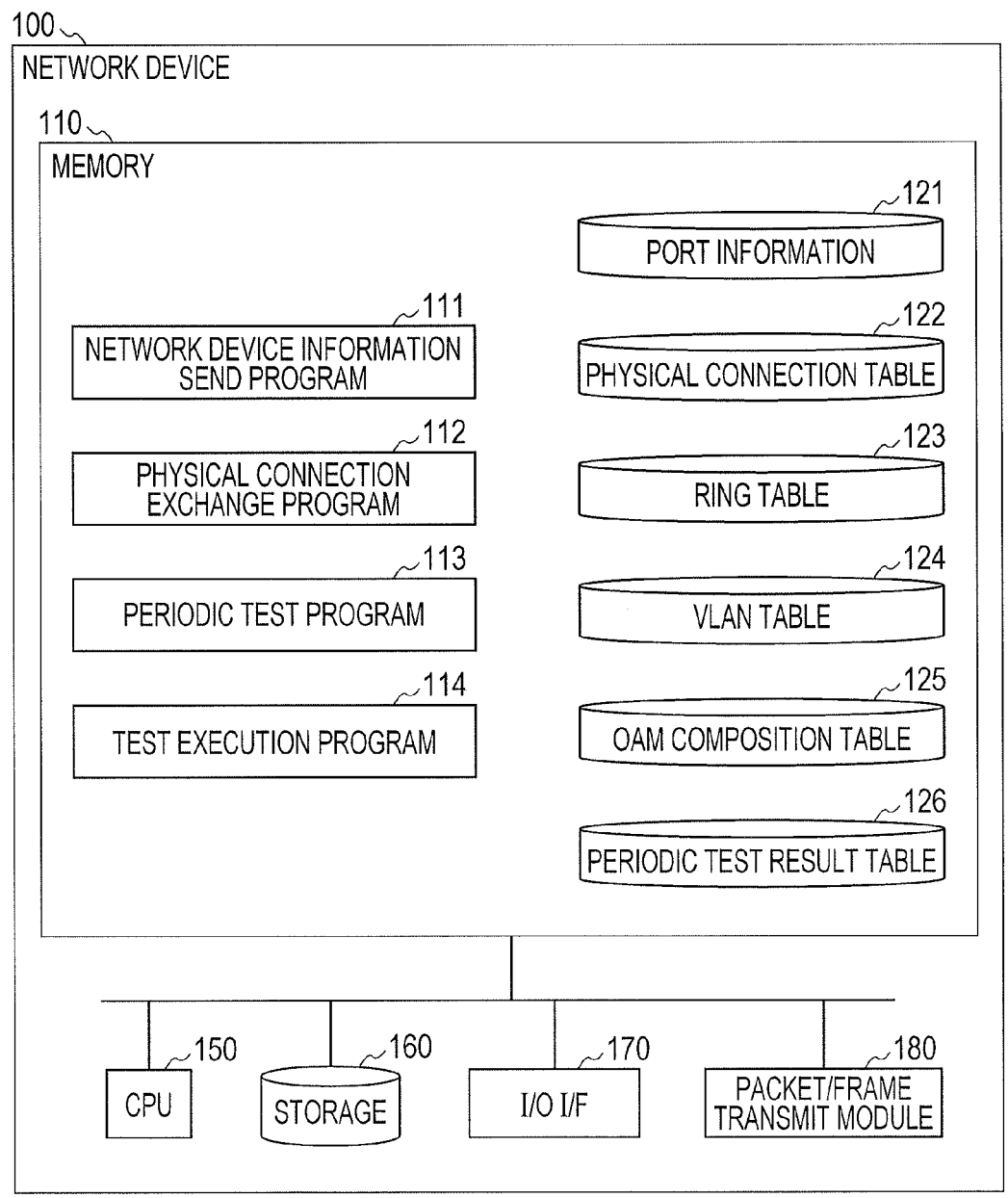
FIG. 11 is a block diagram of the network device 100 of the first embodiment.

FIG. 11 is a block diagram of the network device 100 of this embodiment. The network device 100 is comprised for example of a memory 110, a processor unit (CPU) 150, a storage unit 160, an I/O interface (I/F) 170, and a packet/frame transmit module 180. The memory 110 for example stores a network device information send program 111, a physical connection exchange program 112, a periodic test program 113, a test execution program 114, a port table 121, a physical connection table 122, a ring table 123, a VLAN table 124, an OAM composition table 125, and a periodic test result table 126. The CPU 150 executes each of the programs.

When a request from an external location such as the management server 500 is received, the network device information send program 111 sends port table, physical connection table, ring table, VLAN table, OAM composition table to the requesting source. The physical connection exchange program 112 exchanges information with the adjacent network device 100, and generates the physical connection table 122. The periodic test program 113 periodically performs OAM testing, and detects failures. If a failure is detected then the program 113 notifies the management server 500. The test execution program 114 executes the user command test.

FIG. 12 is a drawing for describing the port table 121 of this embodiment. The port table 121 for example contains a port ID 1211, and the port identification information 1212. The port ID 1211 is information for specifying a port in one of the network devices 100. The port identification information 1212 is information for specifying a port in all of the network devices 100 and example is a MAC address, etc. FIG. 12 shows port information for the network device 100D. Information for the network device 100D is shown in the same way hereafter in FIG. 13, FIG. 14, FIG. 15, FIG. 16, and FIG. 17.

FIG. 13 is a drawing for describing the physical connection table 122 of this embodiment. The physical connection table 122 contains for example the port ID 1221, and the adjacent port identification information 1222. The port ID 1221 is information for specifying a port in one network device 100. The adjacent port identification information 1222 is information for identifying the port adjacent to each port.

FIG. 14 is a drawing for describing the ring table 123 of this embodiment. The ring table 123 contains the ring ID 1231, the master node 1232, the forwarding port ID 1233, the blocking port ID 1234, and the assigned VLAN ID 1235. The ring ID 1231 is information for specifying the ring. The master node 1232 is information whether or not the network device 100 is the master node for that ring. The forwarding port ID 1233 is the ID of the port used in communications when the ring is operating normally, and is information retained only in the case of the master node. The blocking port ID 1234 is the ID for the port used only in abnormal situations and is not used during normal operation, and moreover is information retained only in the case of the master node. The assigned VLAN ID 1235 is the ID for the VLAN assigned to the ring, and is information retained only in the case of the master node.

FIG. 15 is a drawing for describing the VLAN table 124 of this embodiment. The VLAN table 124 for example contains the VLAN ID 1241, and the assigned port ID 1241. The VLAN ID 1241 is information for specifying the VLAN. The assigned port ID 1242 is information for identifying the port for assigning the VLAN.

FIG. 16 is a drawing for describing the OAM composition table 125 of this embodiment. The OAM composition table 125 contains for example MA ID 1251, the test target VLAN 1252, and the MEP ID 1253. The MA ID 1251 is information for specifying the MA. The test target VLAN 1252 is information for specifying the VLAN that sends the test frame of each MA. The MEP ID 1253 is information for specifying the MEP, and is the ID for the port shown set in the brackets in FIG. 16.

FIG. 17 is a drawing for describing the periodic test result table 126 of this embodiment. The periodic test result table 126 contains for example the test execution time 1261, the target MA 1262, the remote MEP ID 1263 and the results 1264. The test execution time 1261 is the time that the testing started. The target MA 1262 is the ID for the MA that was tested. The remote MEP ID 1263 is the ID of the MEP of the destination of the test (continuity check). The results 1264 are the results from executing the test.

FIG. 18 is a drawing for describing the user interface for failure notification on the management terminal. When a failure occurs the management terminal displays a list of the impacted VLAN impacted due to that failure and the failure occurrence time. Information on the customers using each VLAN is also displayed as shown in FIG. 18.

Though only the test target VLAN is actually tested, even VLAN that are not being directly tested can be displayed on the management terminal as VLAN affected by the failure. In other words, the affected VLAN can be specified with a minimum of test traffic and provided to the provider/operator.

FIG. 19 is a drawing for describing the user interface for setting test conditions on the management terminal. The management terminal displays a map for selecting a VLAN from the list that needs to be tested and the test points. Moreover here, when a VLAN is selected from the list of the test target VLAN, only the network device 100 and port set for the VLAN selected on the map are selectable. Network devices 100 not set for the VLAN are shown as grayed-out (inactive). The test points can even be input into a text box. Choosing test points on the map allows easily selecting the test target.

Pressing the "TEST" button executes the test based on the information that was input.

Figure 20:
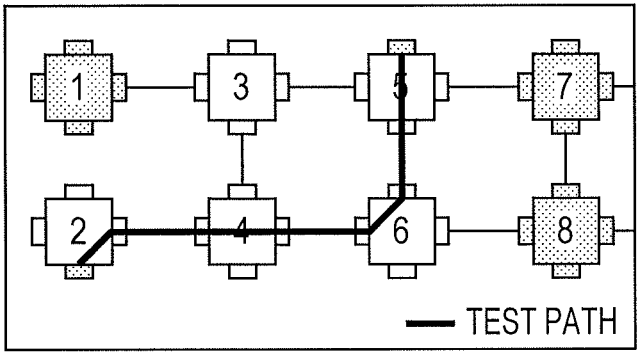
FIG. 20 is a drawing for describing the user interface for displaying test results on the management terminal 700 of the first embodiment.

FIG. 20 is a drawing for describing the user interface for displaying test results on the management terminal. The management terminal displays whether the test results are an OK or an NG, and displays the tested path on the map.

FIG. 21 is a drawing for describing the user interface for displaying logs on the management terminal. The management terminal displays a log of detected failures in the periodic test and operator command test.

Actually multiple test result logs are generated for VLAN that are tested. Namely, tests are made on multiple VLAN in a single testing so that test traffic can be reduced and the load on the network devices 100 can be lowered.

Figure 22:
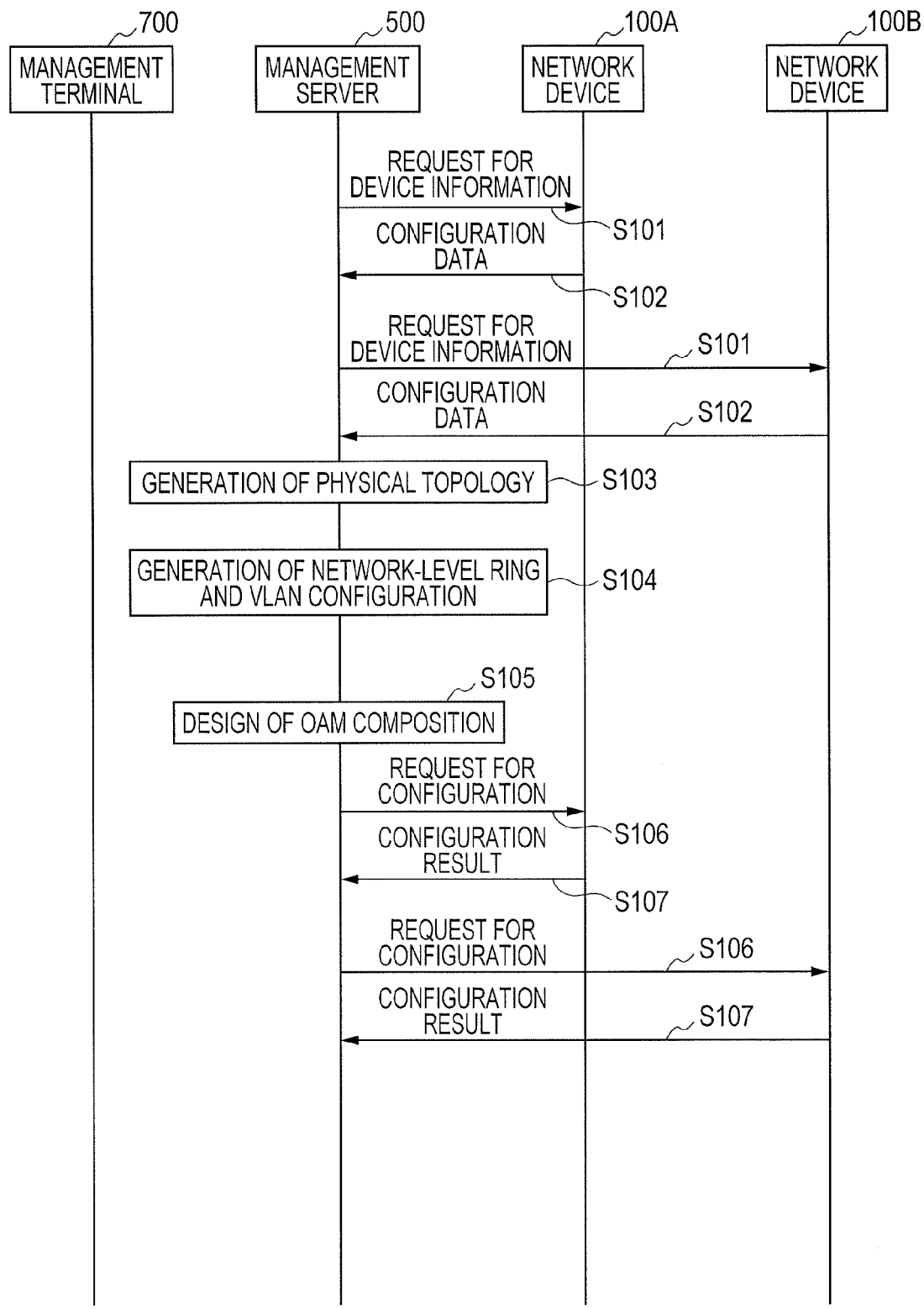
FIG. 22 is a sequence diagram for OAM composition design and setting processing in the first embodiment.

FIG. 22 is a sequence diagram for OAM composition design and the setting processing in this embodiment. FIG. 23 is a drawing for describing the messages sent and received for the OAM composition design and the setting processing in this embodiment.

First of all, the management server 500 makes a request to the network device 100 for configuration data (S101). When the network device 100 receives this request, it sends its own retained configuration data to the management server 500 (S102). The configuration data includes for example, port table, physical connection table, ring table, and VLAN table. The management server 500 generates the physical topology information based on the acquired information (S103). More specifically, the management server selects a port with the same identification information as the adjacent port identification information 5223 in FIG. 4, and links the port ID 5212 in FIG. 3 with its own port ID 5222, and registers this as link information in FIG. 5.

The management server 500 generates network-level ring table and VLAN configuration (S104). More specifically, the management server 500 sets an entry identical to the assigned VLAN ID 1235 and the ring ID 1231 of the ring table combination collected from the network devices 100 as one entry 1 of the network-level ring table. The management server 500 also collects entries having the same VLAN ID, and sets them as one entry 1 in the network-level VLAN information.

The management server 500 designs the OAM composition by using the network-level ring table and the network-level VLAN table (S105). This processing is described in detail later on while referring to FIG. 24. The management server 500 sets the designed contents in the network device 100 (S106). These designed contents include for example the MA ID, the test target VLAN for each MA, and the MEP information (MEP ID, setting port).

Figure 24:
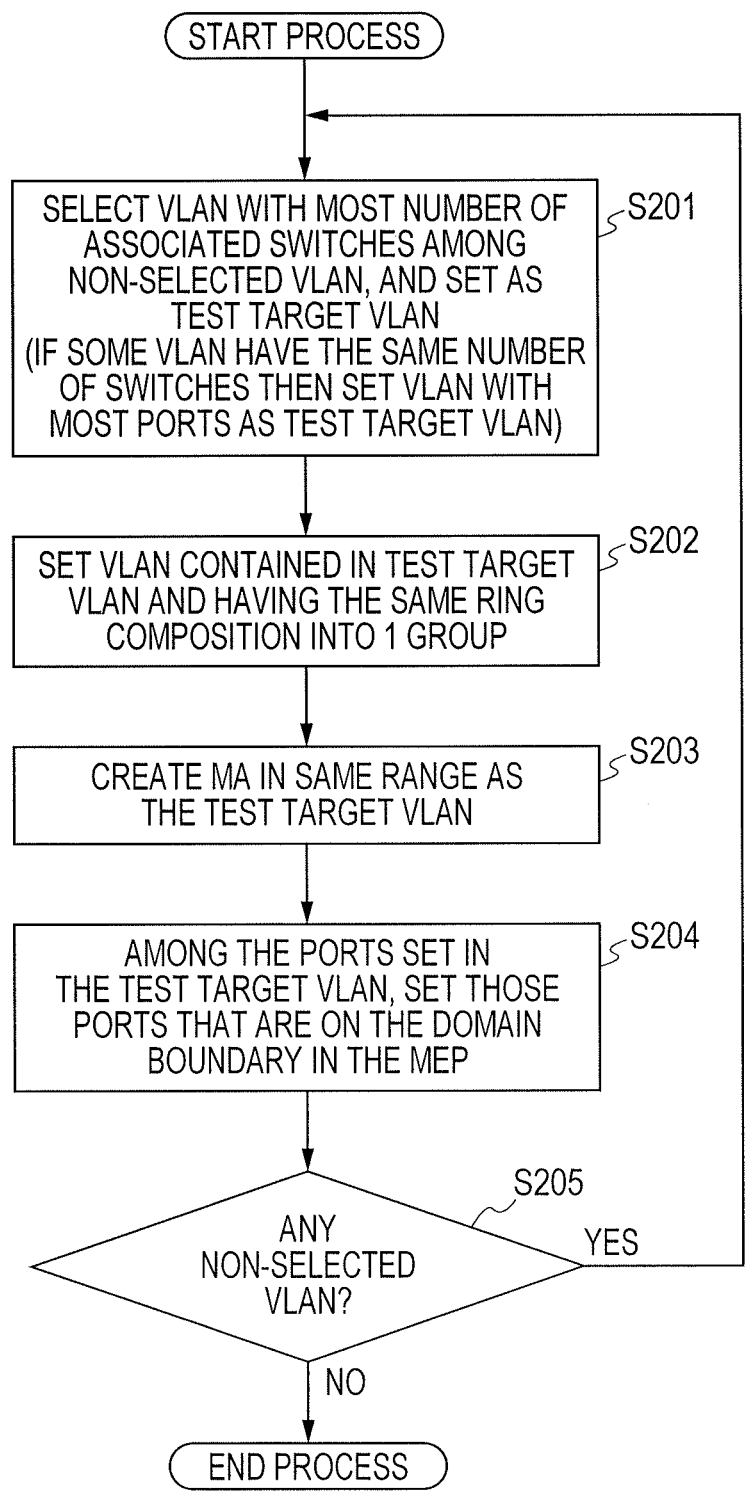
FIG. 24 is a flowchart showing the OAM composition design process in the first embodiment.

FIG. 24 is a flowchart showing the OAM composition design process in this embodiment.

The management server 500 selects the VLAN having the most associated switches from among the non-selected VLAN, and sets that selected VLAN as the test target VLAN (S201). If some VLAN have the same number of switches then the management server 500 selects the VLAN with the largest number of ports.

VLAN having the same associated ring composition as the test target VLAN among the non-selected VLAN are set in a single group (S202). In other words, those VLAN having the same transfer path are grouped together. Here, the same ring composition more specifically signifies the composed network device, the master node ID, the forwarding port, and a blocking port that are the same in the network-level ring table. The present embodiment only considers the ring composition however the paths change during failures even with redundant technology such as LA (Link Aggregation), uplink redundancy, and STP (Spanning Tree Protocol) so that the VLAN may be grouped even if utilizing these redundant technologies.

The management server 500 creates a MA within the same range at the test target VLAN (S203). Among those ports where the test target VLAN are set, the management server 500 sets ports with the same domain boundary shown in FIG. 3 in the MEP (S204).

The management server 500 checks whether there are non-selected VLAN or not (S205). If there are non-selected VLAN, then the process returns to S201. If there are no non-selected VLAN then the process ends.

Figure 25:
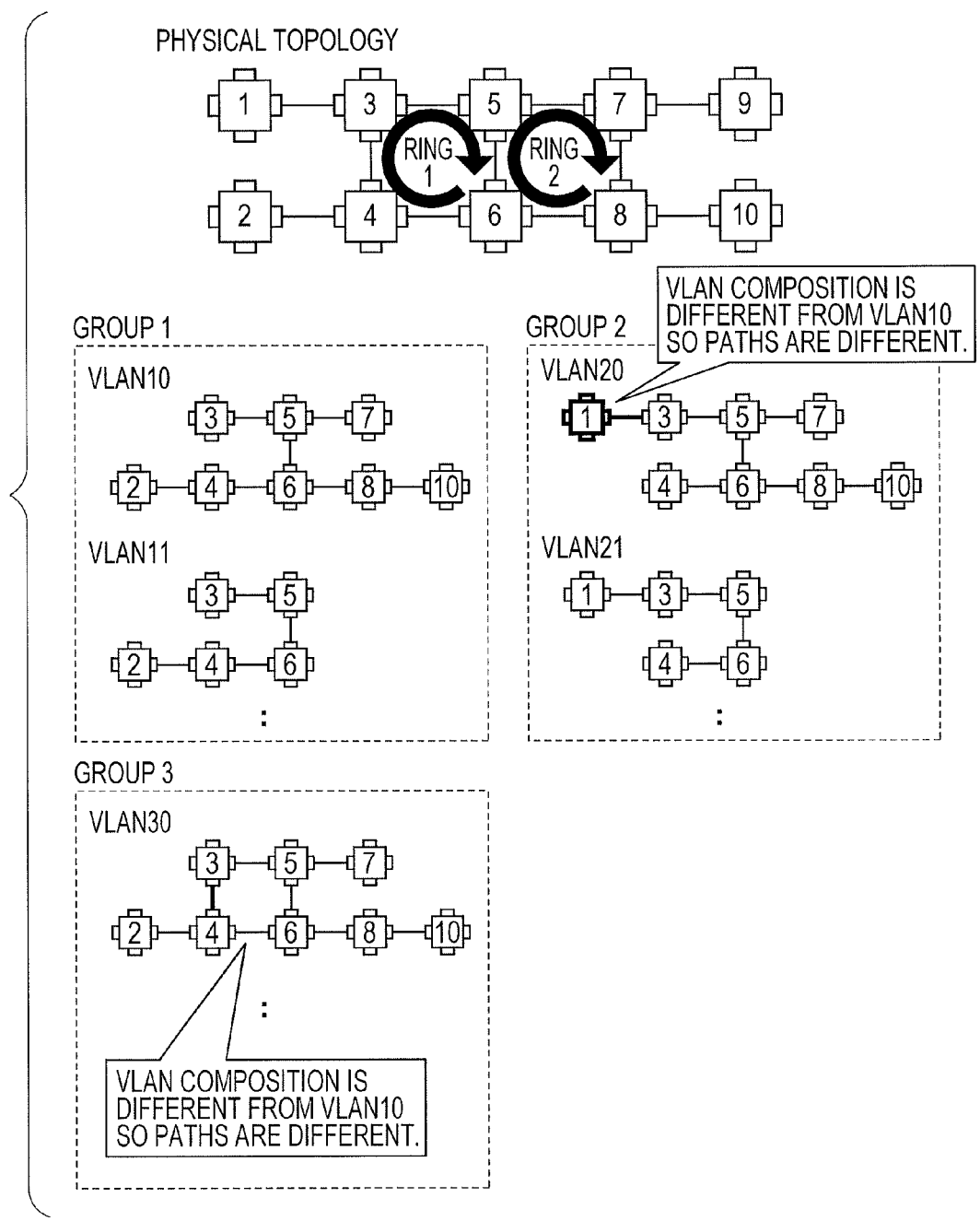
FIG. 25 is a chart for describing the OAM composition design process in the first embodiment.

FIG. 25 is drawings for describing the specific operation in the OAM composition design process flow in FIG. 24. The physical topology is information for showing the physical connection per the network device 100. The structure in FIG. 25 is comprised of ten network devices 100. The ring 1 is comprised of the network devices 3, 4, 5, and 6; and the ring 2 is comprised of 5, 6, 7, and 8.

The virtual topology of the VLAN is shown next. The VLAN 10 is configured on the network devices 2, 3, 4, 5, 6, 7, 8, and 10. Moreover in this ring composition, the link between network devices 3 and 4, and the link between the network devices 7 and 8 are not used while in a normal state. The VLAN 11 is configured on the network devices 2, 3, 4, 5, and 6, the rings are the same composition as in VLAN 10, and the VLAN10 contains the paths. The VLAN10 and VLAN11 are therefore placed in the same group 2. The VLAN20 is configured on the network devices 1, 3, 4, 5, 6, 7, 8, and 10, and configure on different network devices from the VLAN10. The VLAN20 is therefore set in the group 2 which is separate from the VLAN10.

The VLAN30 is configure on the same network devices as the VLAN10 but the forwarding ports for ring 1 are different, with no link used between the network devices 4 and 6. The VLAN10 therefore uses different paths and so is set in the separate group 3.

EXAMPLE 2

Figure 26:
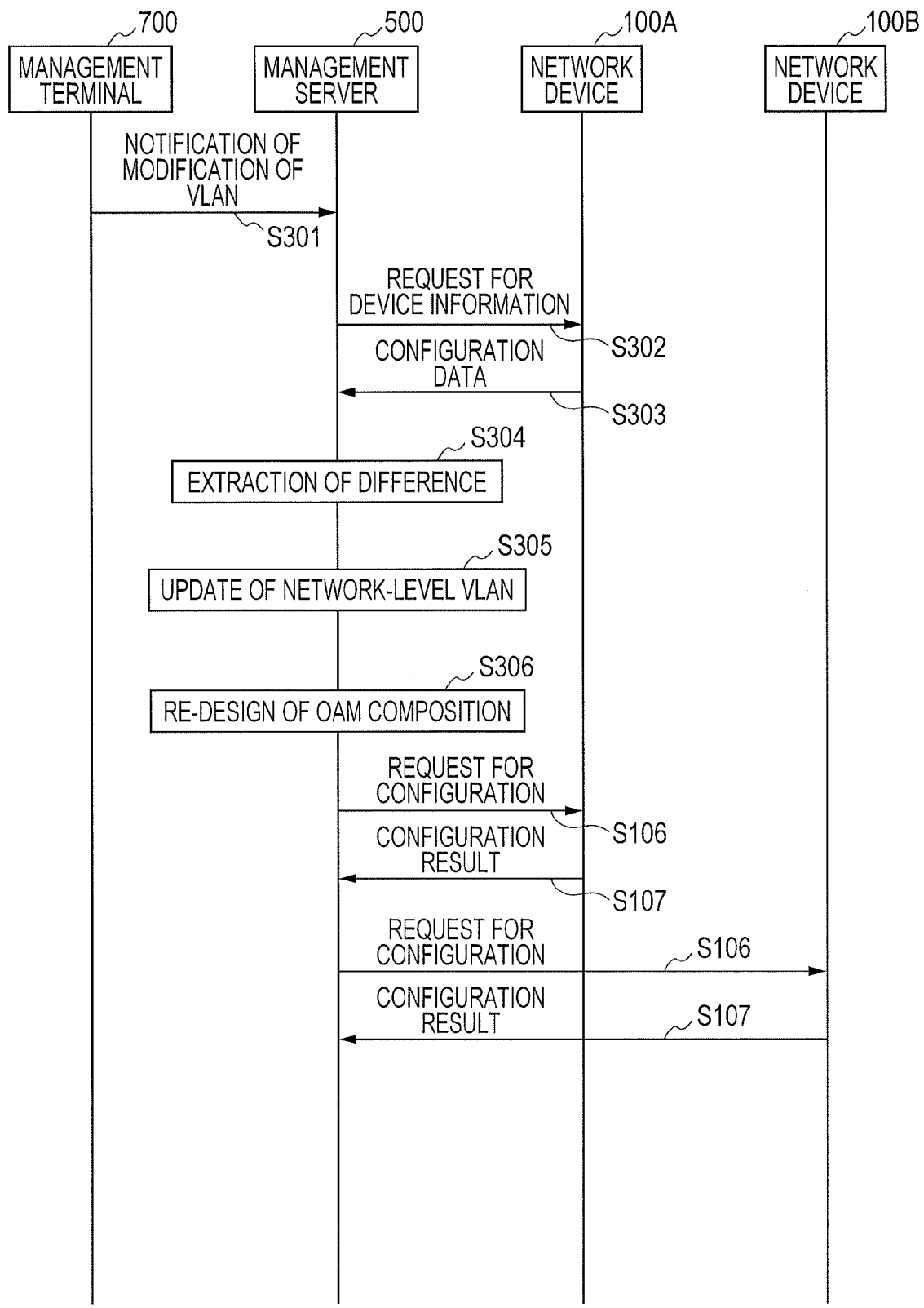
FIG. 26 is a sequence chart of the OAM composition redesign process when modifying the VLAN in the first embodiment.

FIG. 26 is a sequence chart for describing the OAM composition design process, as well as the setting process when modifying the VLAN in this embodiment. FIG. 27 is a drawing for describing the messages sent and received in the OAM composition design, as well as the setting process in this embodiment. The processing shown in FIG. 22 is re-performed when the composition of the physical topology, rings, or LA was modified.

When the VLAN was modified, the provider/operator first of all utilizes the management server 500 to give notification of modification of VLAN (S301). This notification of modification of VLAN contains for example the target switch for modifying, the VLAN ID of the target VLAN for modifying, the modify content (added, deleted, modified VLAN) information. In the case of "add" or "delete" or "modify" contents, the management server 500 makes a request for configuration data to the network devices 100 (S302) in order to collect VLAN configuration data from the network devices 100. When the network devices 100 receive this request, they send their own configuration data to the management server 500 (S303). In FIG. 26, the management server 500 collects VLAN modify content from the network devices 100 but the VLAN modify content may be input from the management terminal instead.

In the case of "modify" contents, the management server 500 may extract the difference between the collected compositions and the compositions retained by the management server 500 for use in the specified VLAN composition targeted for modification (S304).

The management server 500 then updates the network-level VLAN table according to the extracted difference, or according to the added or deleted contents (S305). The management server 500 next redesigns the OAM composition by using the updated network-level VLAN table (S306). This process is described later on in detail while referring to FIG. 28.

Next, the management server 500 sets the design results in the network devices 100 (S106).

Figure 28:
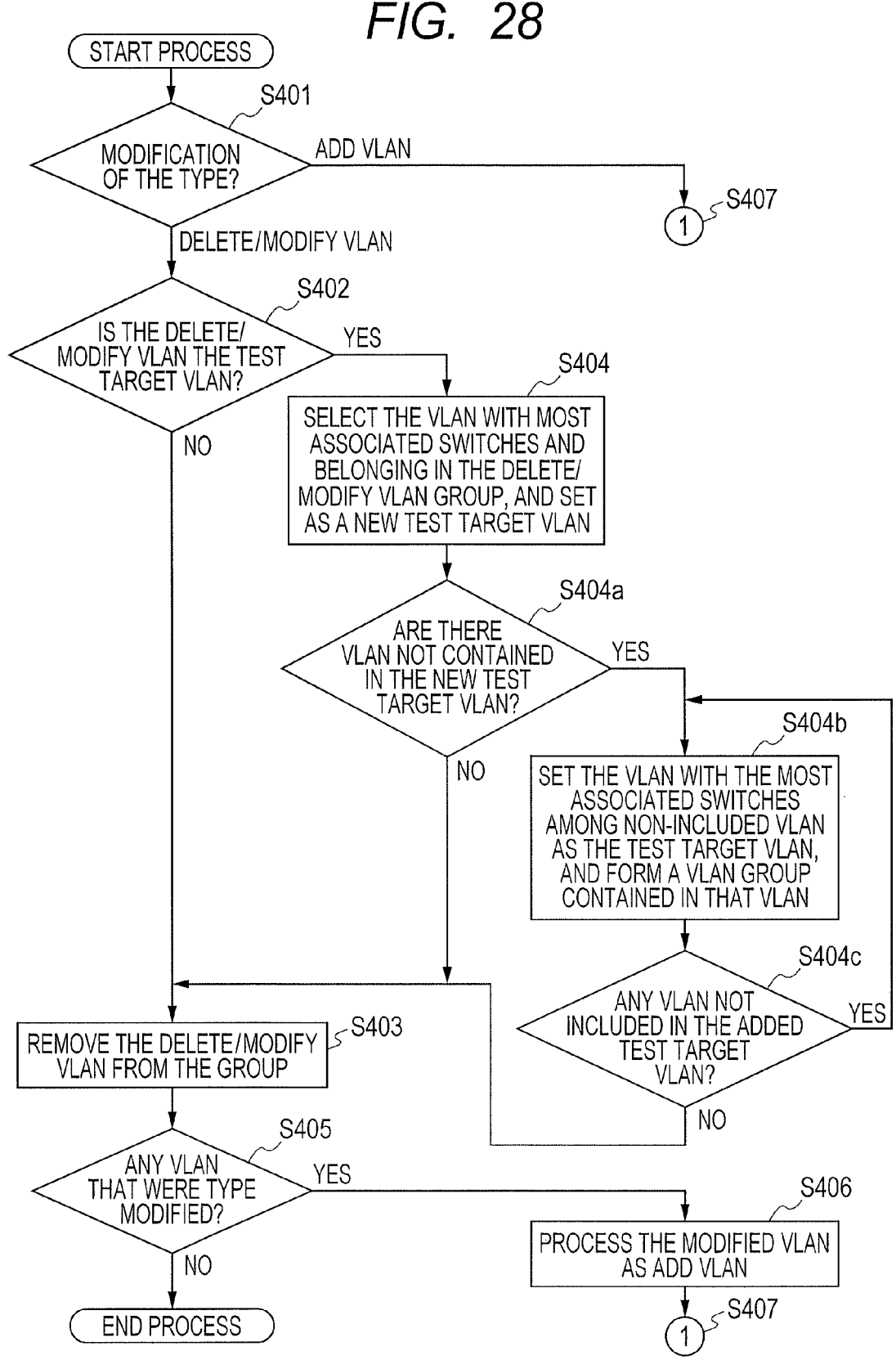
FIG. 28 is a flowchart of the OAM composition redesign process when modifying the VLAN in the first embodiment.
Figure 29:
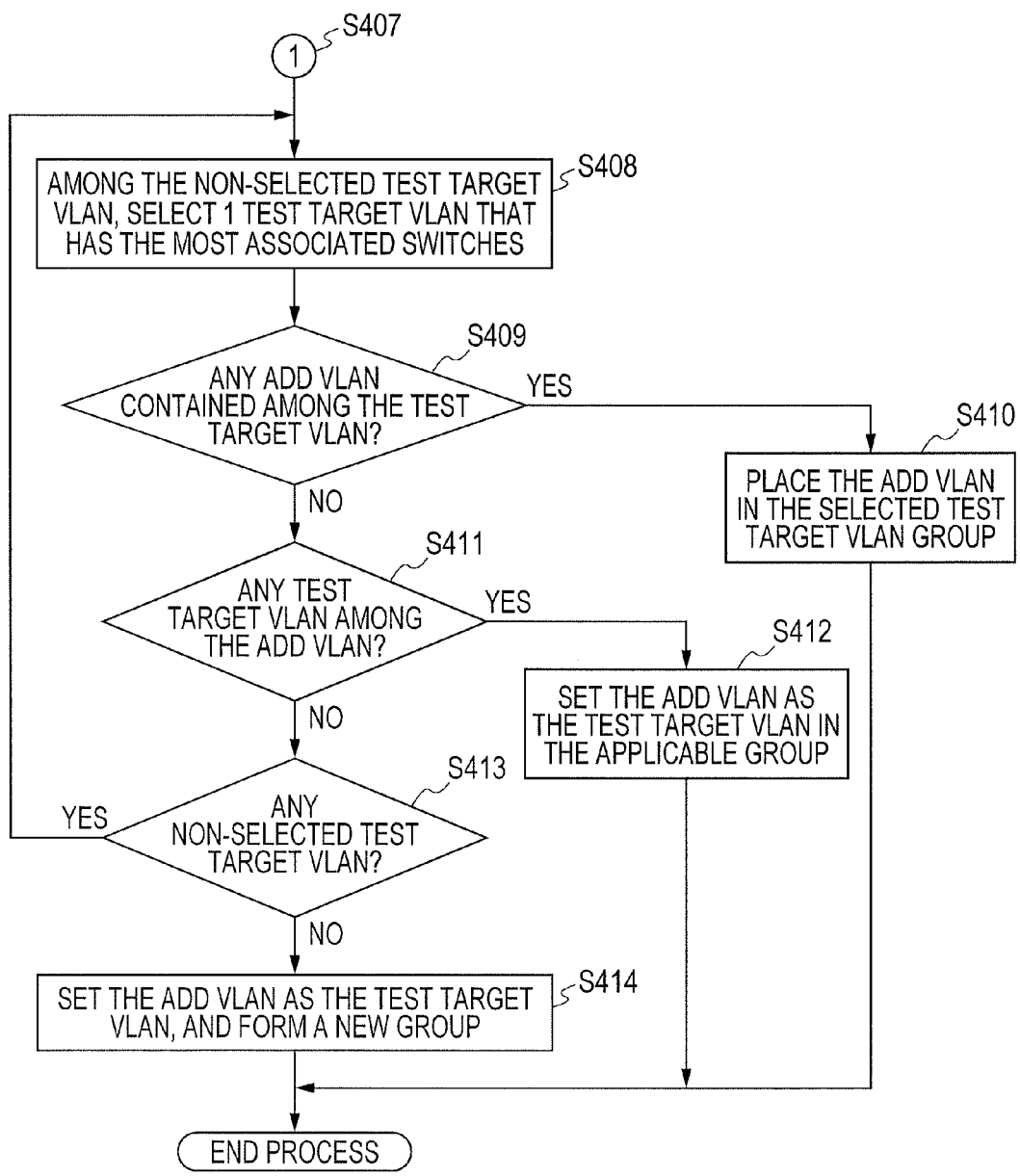
FIG. 29 is a flowchart of the OAM composition redesign process when modifying the VLAN in the first embodiment.

FIG. 28 and FIG. 29 are flowcharts of the OAM composition redesign process in this embodiment.

If adding a VLAN, the management server 500 proceeds to process S407 according to the type of VLAN modification. In the case of modifying or deleting VLAN, the management server 500 proceeds to the process S402 (S401).

When the target VLAN for deletion or modification is the test target VLAN, then the VLAN having the largest number of switches and belonging within the group of the target VLAN for deletion or modification is selected and set as the new test target VLAN (S404). If there is no test target VLAN, then the target VLAN for deletion or modification is excluded from the group where the applicable VLAN belongs (S403).

A check is next made of whether the modification type is a VLAN modification (S405). If there is a VLAN modification, then the process continues from then onwards with the target VLAN for modification as the added VLAN (S406). If there is no VLAN modification, or in other words, a VLAN deletion, then the process ends.

If in S404 there are VLAN not included within the new test target VLAN (S404*a*), then the VLAN not included among the new test target VLAN and having the largest number of switches is set as the new test target VLAN and a group is then formed including these VLAN (S404*b*). If a VLAN is further found that is not included among these new test target VLAN then S404*b* is implemented again (S404*c*).

The following processing is implemented after the processing in S401 and S406. The VLAN with the largest number of switches and belonging among the test target VLAN is selected (S408).

A check is made on whether the added VLAN is included among the selected test target VLAN or not (S409). If included, then that added VLAN is placed in the group of the selected test target VLAN (S410) and the processing ends. If not included then a check is made on whether the selected test target VLAN is included in the added VLAN (S411). If included, then the added VLAN is set as the test target VLAN in the selected test target VLAN group (S412). If not included, then a check for any non-selected test target VLAN (S413). If there are non-selected test target VLAN then the process returns to process (S408). If there are not any non-selected test targets VLAN then the added VLAN is set as the test target VLAN, a new group is formed (S414) and the process ends.

EXAMPLE 3

Figure 30:
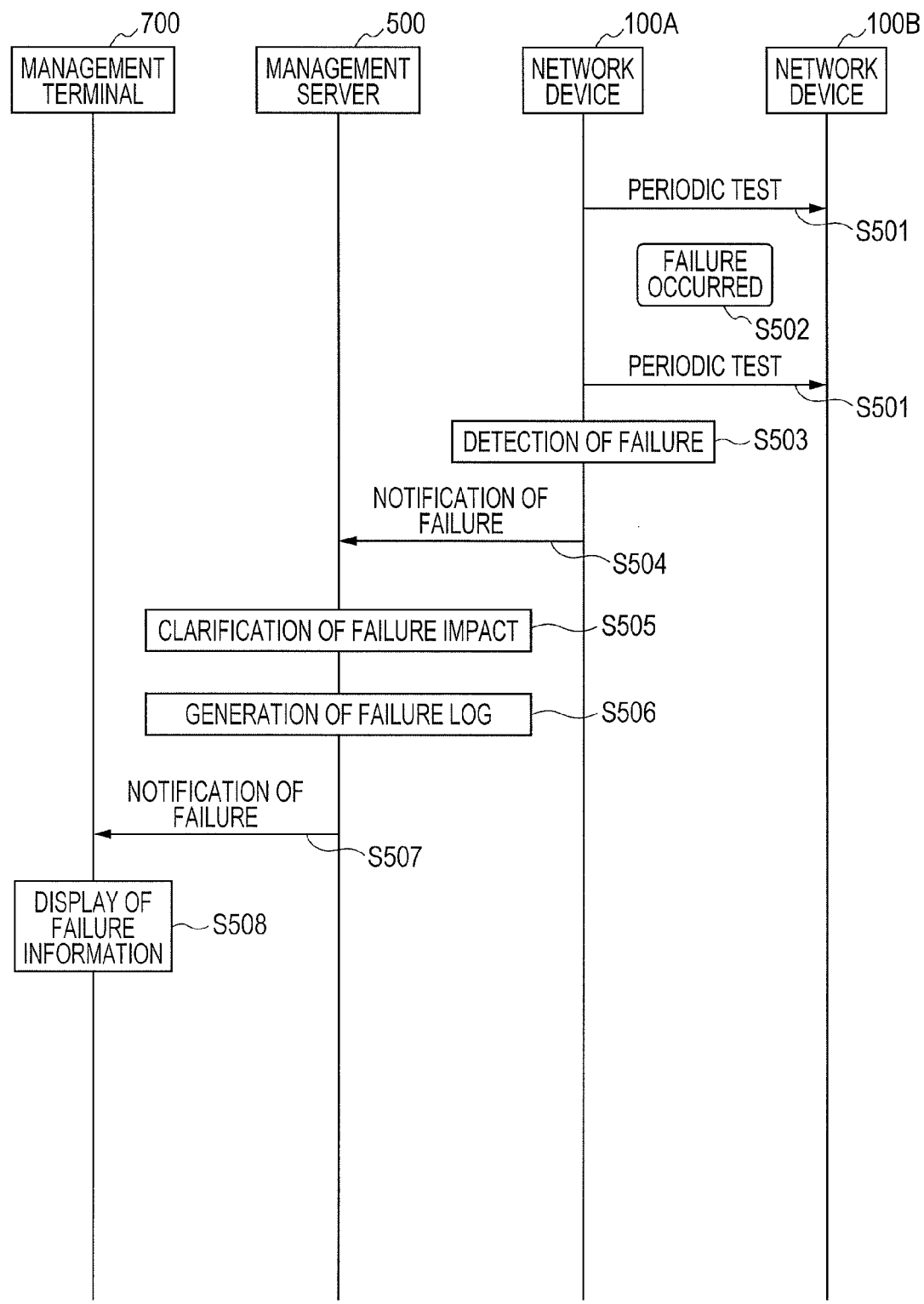
FIG. 30 is a sequence chart of the periodic test process of the first embodiment.

FIG. 30 is a sequence chart during the periodic testing process in this embodiment. FIG. 31 is a table for describing the messages sent and received during the periodic testing process in this embodiment. This sequence is for the operating phase for performing test of the network after completing the OAM composition design as well as the setting process shown in FIG. 22.

In the periodic test, a communication continuity check is periodically made among the network devices 100 (S501). When a failure occurs (S502), the network devices 100 detect a failure (S503). The network device 100 notifies the management server 500 of the failure via an SNMP trap, etc. (S504). The failure notification includes for example the source network device ID of failure notification, MA ID, and the destination information on where the failure was detected.

When the failure notification is received the management server 500 specifies the failure impact range (S505). The VLAN utilizing the same path on which the failure occurred is specified. The specific process for specifying the failure impact range is as follows. The VLAN group related to the MA where the failure was detected is specified from the MA information table and the VLAN group in FIG. 8. VLAN including in both the destination network device 100 where the failure was detected, and the network device 100 that gave the failure notification are specified from among the VLAN contained in the specified VLAN group. The specified VLAN is on the same path as the test target VLAN where the failure was detected and so even these VLAN are seen as possible failure occurrence locations, and a failure log is made for each specified VLAN (S506).

The management server 500 notifies the management terminal that a failure occurred on the specified VLAN (S507). The failure notification information includes for example, the failure VLAN information and the failure time. The management terminal displays the received failure information (S508).

EXAMPLE 4

Figure 32:
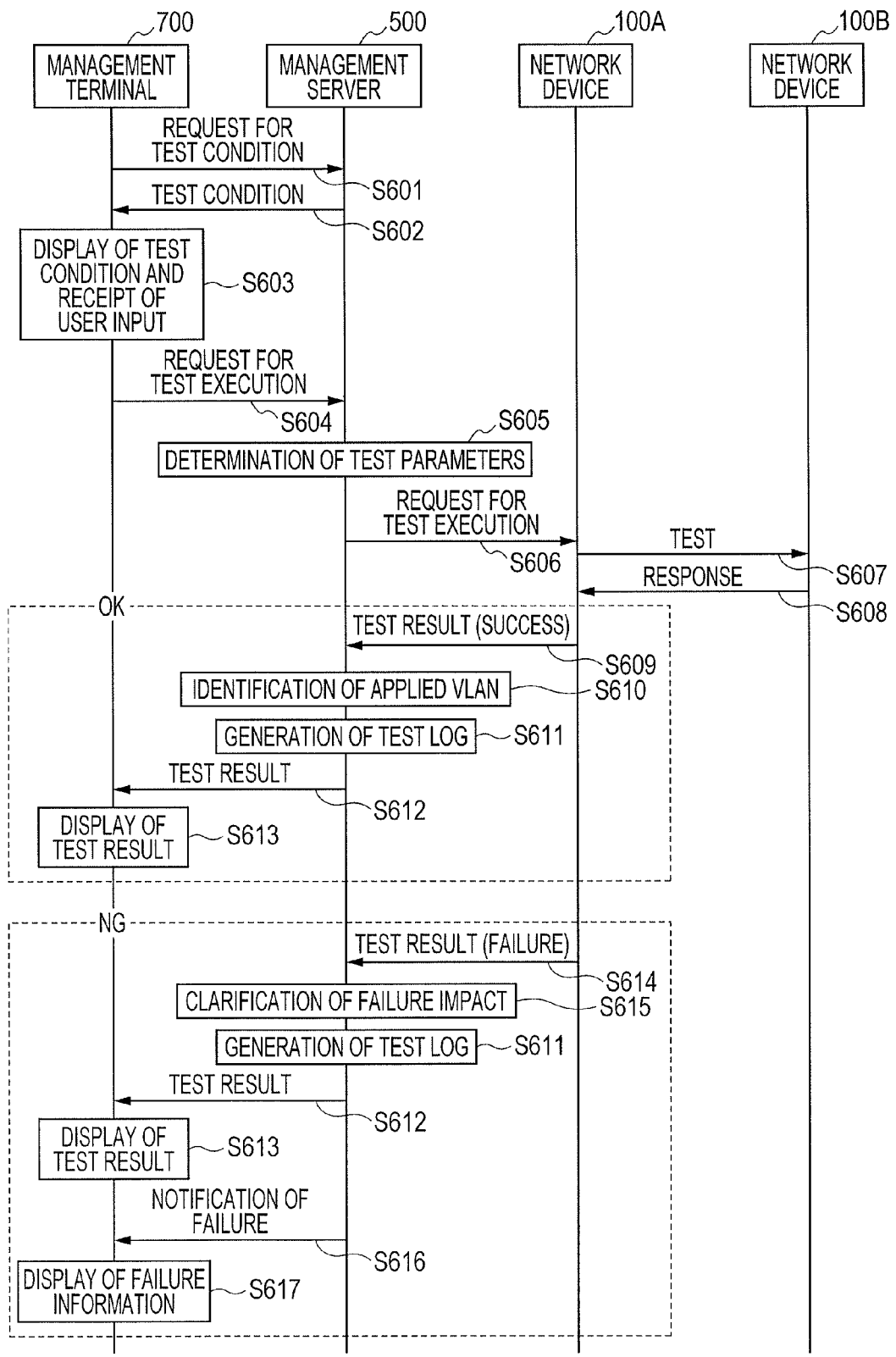
FIG. 32 is a chart showing the sequence of testing during the user command in the first embodiment.

FIG. 32 is a chart showing the sequence chart of testing during the user command in this embodiment. FIG. 33 is a drawing for describing the messages sent and received at testing during the operator command in this embodiment.

This sequence is for the operating phase for performing testing of the network after completing the OAM composition design as well as the setting process shown in FIG. 22. This is a phase in which a failure was detected in the periodic test shown in FIG. 30 and further the failure was analyzed in detail.

The management terminal makes a request for test condition to the management server 500 in order to assist in entry of test conditions by the operator (S601). The management server 500 then sends the test condition to the management terminal (S602). This test condition includes VLAN list information and physical topology information.

The management terminal displays the received test conditions on a screen as shown on FIG. 19 to make it easy for the operator/provider to set the test condition and accepts entries made by the operator (S603). After accepting entries from the operator, the management terminal makes a request for test execution to the management server 500 (S604). This request for test execution includes for example the specified VLAN ID information, and the test points (2 points) information.

The management server 500 sets the test parameters (S605). More specifically, if the specified VLAN is the test target VLAN, then that VLAN is tested. If the specified VLAN is not the test target VLAN, then a test target VLAN in the VLAN group containing the specified VLAN is tested. The MEP ID corresponding to the port that is the specified test point is found by referring to the OAM composition table shown in FIG. 9.

A request for executing a test according to the parameters that were set is then made to the network device 100 possessing the test points entered by the operator (S606). The request for test execution for example includes MA ID information and destination MP ID information. The network device 100 executes the test (S607).

If the test was a success then the network device 100 notifies the management server 500 of the test results (S609). The test results for example include test result, path information, and test condition (specified VLAN, test points) information.

The management server 500 specifies the VLAN to which the results of the executed test can actually be applied (S600). The actual processing is the same as specifying the failure impact (range) in FIG. 30.

The log program generates a test success log for the specified VLAN (S611). The management server 500 notifies the management terminal of the test result (S612). This test result includes for example test results such as the operator specified VLAN and the test results. The management terminal displays the test results on the screen (S613).

If the test was a failure then the network device 100 notifies the management server 500 of the test results (S614). These test results include for example test result, path information, and test condition (specified VLAN, test points) information.

The management server 500 specifies the failure impact (range) (S615). More specifically, the processing is performed the same as specifying the failure impact range in FIG. 30.

The log program creates a generation of failure log for the specified VLAN (S611). The management server 500 notifies the management terminal of the test results (S612). This test result includes for example test results such as the operator specified VLAN and test results. The management terminal displays the test results on the screen (S613). Moreover, in order to notify the user/operator of the VLAN affected by the failure, the management server 500 notifies the management terminal of the failure (S616). This notification of failure for example includes the failure VLAN information, and the failure time. The management terminal displays the failure information (S617).

EXAMPLE 5

A second embodiment of the present invention is described next. The second embodiment operates this system by utilizing the OAM settings already set in the network, and executes OAM testing and management of the OAM composition.

Figure 34:
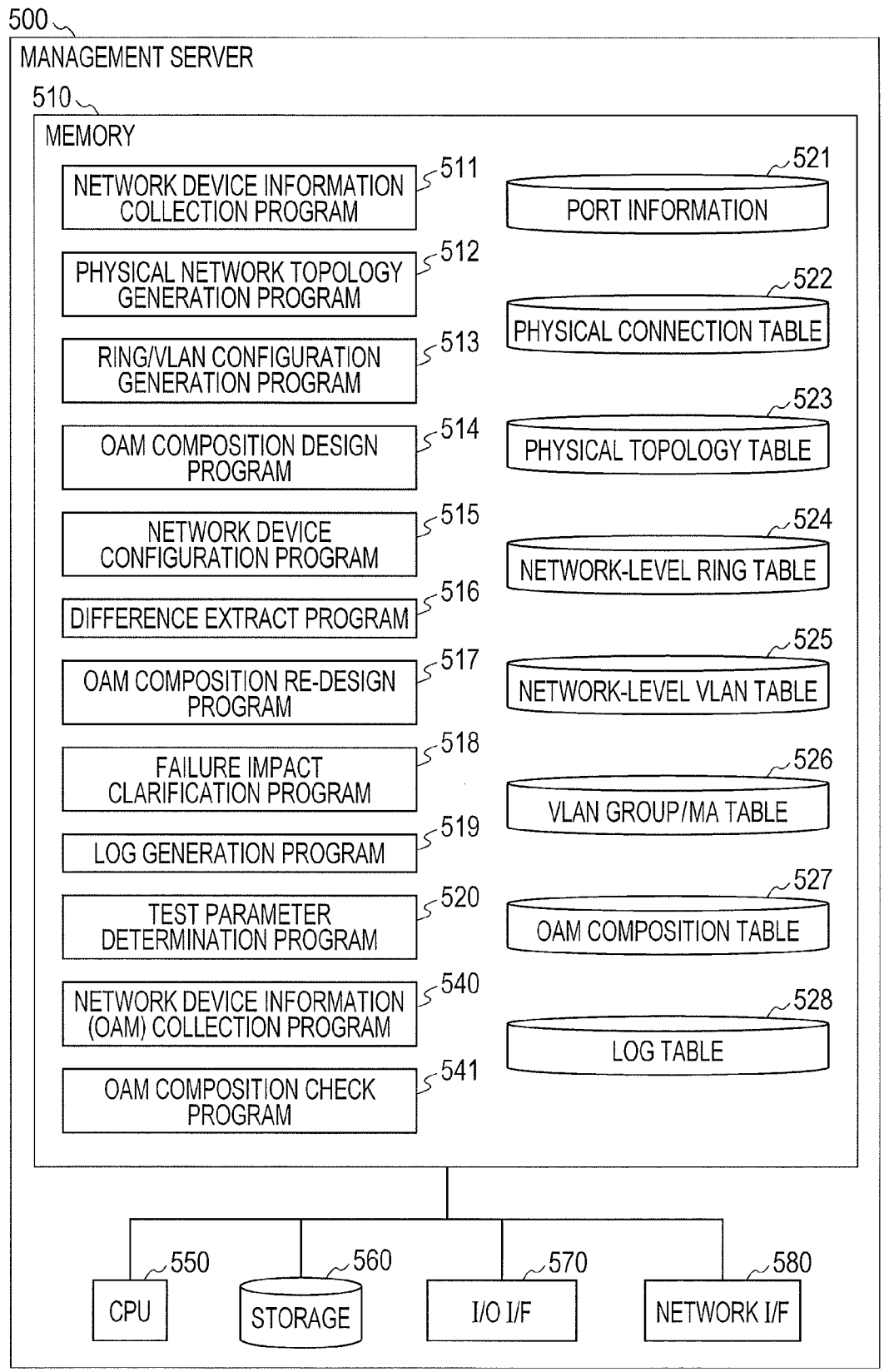
FIG. 34 is a block diagram of the management server 500 of a second embodiment.

FIG. 34 is a block diagram of the management server 500 of this embodiment. Besides the management server 500 shown in FIG. 2, the memory 510 stores, the network device information (OAM) collection program 540, and the OAM composition check program 541. The network device information (OAM) collection program 540 collects setting information relating to the OAM composition from the network device 100. The OAM composition check program 541 checks the OAM composition information that was collected from the network devices 100.

FIG. 35 is a drawing for describing the user interface for making settings and displaying OAM composition check results on the management terminal 700. The management terminal displays a list of VLAN that cannot be tested, based on the OAM composition check results in the management server 500. The user/operator judges based on those results whether to manually modify the OAM composition or to automatically set the OAM composition so as to allow testing of all VLAN by the management server 500. To make automatic settings, the user presses the "AUTO SET" button. Pressing the "AUTO SET" button displays the "OAM Composition Auto Set" screen. An operator wishing to minimize the number of test target VLAN places a checkmark in the "MINIMIZE NUMBER OF TEST TARGET VLAN" box. However placing a checkmark might change the MA that were already present.

Figure 36:
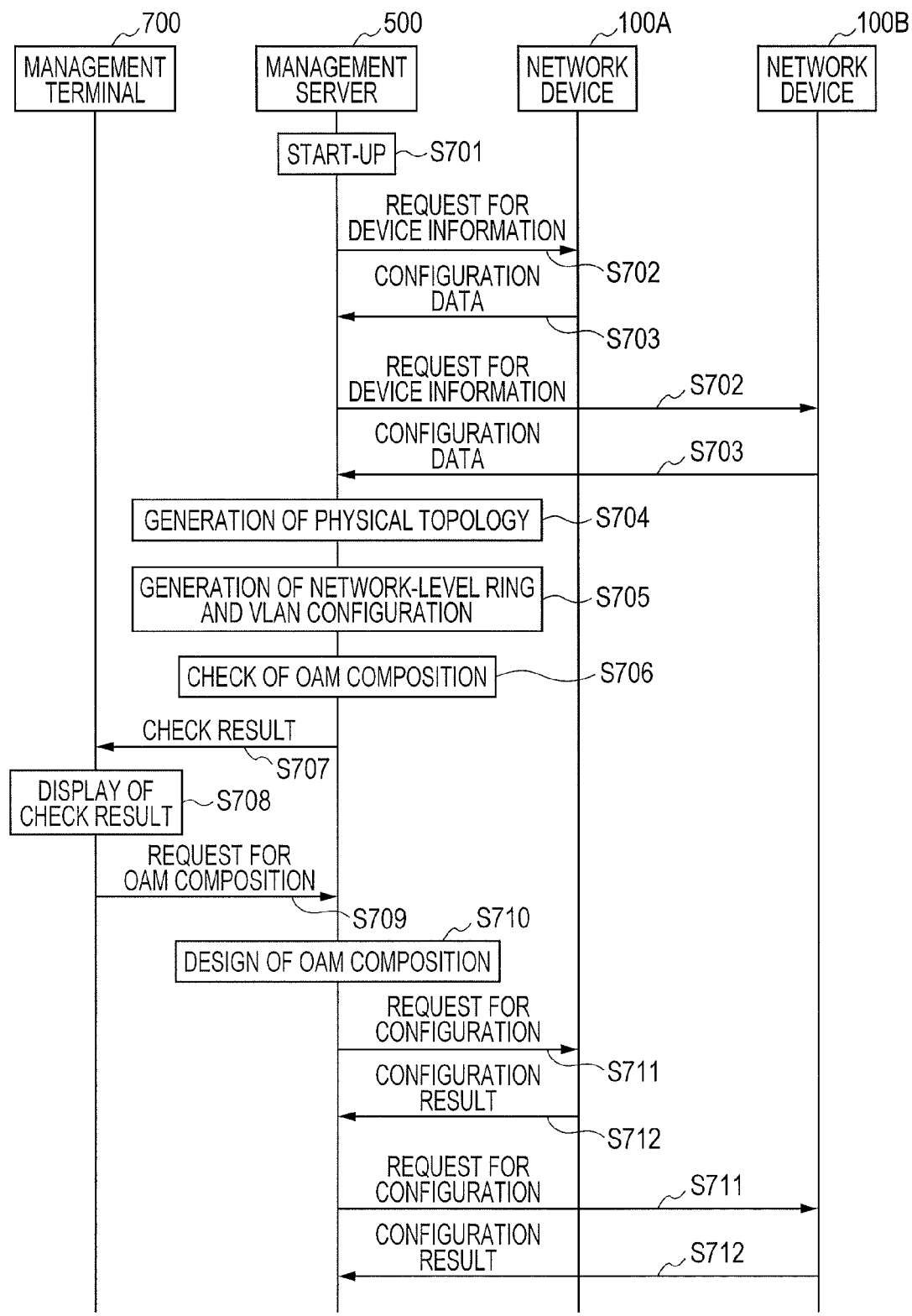
FIG. 36 is a sequence chart for check processing of the OAM composition in the second embodiment.

FIG. 36 is a sequence chart for the OAM composition check processing in this embodiment. FIG. 37 is a drawing for describing the messages sent and received in the OAM composition check processing of the fifth embodiment.

A precondition for executing this sequence is that the OAM is set in the network device 100.

After startup (S701), the management server 500 makes a request for configuration data to the network devices 100 in order to collect network configuration data including OAM composition table from the network devices 100 (S702). The network devices 100 then send the composition information to the management server 500 (S703). This configuration data includes for example, port table, physical connection table, ring table, VLAN table, and OAM composition table.

The management server 500 generates physical topology (table) information based on the obtained information (S704). The processing performed here is the same as the processing described in FIG. 22.

The management server 500 generates a network-level ring table and a network-level VLAN table (S705). The processing performed here is the same as the processing described in FIG. 22.

The management server 500 checks the OAM composition by utilizing the generated physical topology table, network-level ring table and network-level VLAN table (S706). This processing is described later on in detail while referring to FIG. 38.

The management server 500 notifies the management terminal of the check results (S707). These check results include, for example, test availability information and test disable VLAN ID list information. This test availability information is information on whether all VLANs can be tested or there are VLANs impossible to test. If there are VLANs impossible to test, then those VLAN IDs are stored in the test disable VLAN ID list.

The management terminal displays the check results on the screen, and if there are settings or OAM settings from the user/operator, receives instructions on whether to permit or prohibit changing the currently used OAM settings (S709).

The management server 500 designs the OAM composition based on entries by the user/operator (S710). This processing is described later on in detail while referring to FIG. 39.

The management server 500 sets the designed contents in the network device 100 (S710).

Figure 38:
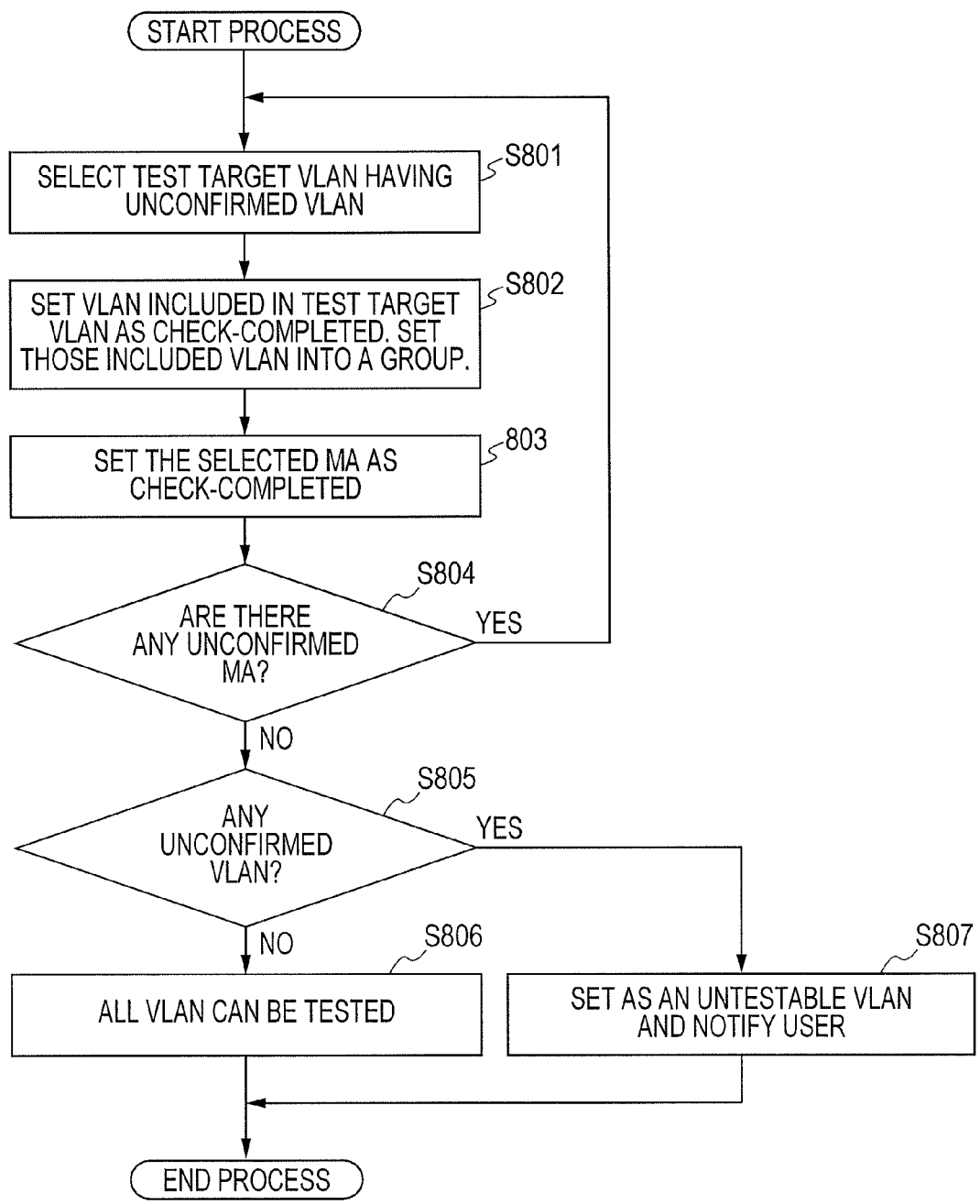
FIG. 38 is a flowchart of the OAM composition check processing of the second embodiment.

FIG. 38 is a flowchart of the OAM composition check process in this embodiment.

The management server 500 selects the test target VLAN for the unconfirmed MA (S801). The VLAN contained in the test target VLAN is set as check-completed. The VLAN contained in the applicable test target VLAN are then set in one group (S802). The selected MA is set as check-completed (S803).

The management server 500 if there is an unconfirmed MA (S804). If there are unconfirmed MA then the processing returns to the process S801. If there is no unconfirmed MA then the check is made on whether there is an unconfirmed MA (S805). If there are no unconfirmed MA then the user is notified that the unconfirmed VLANs are VLANs that are impossible to test (S807). If there are no unconfirmed VLANs, then all of the VLANs can be tested (S806), and the process ends.

Figure 39:
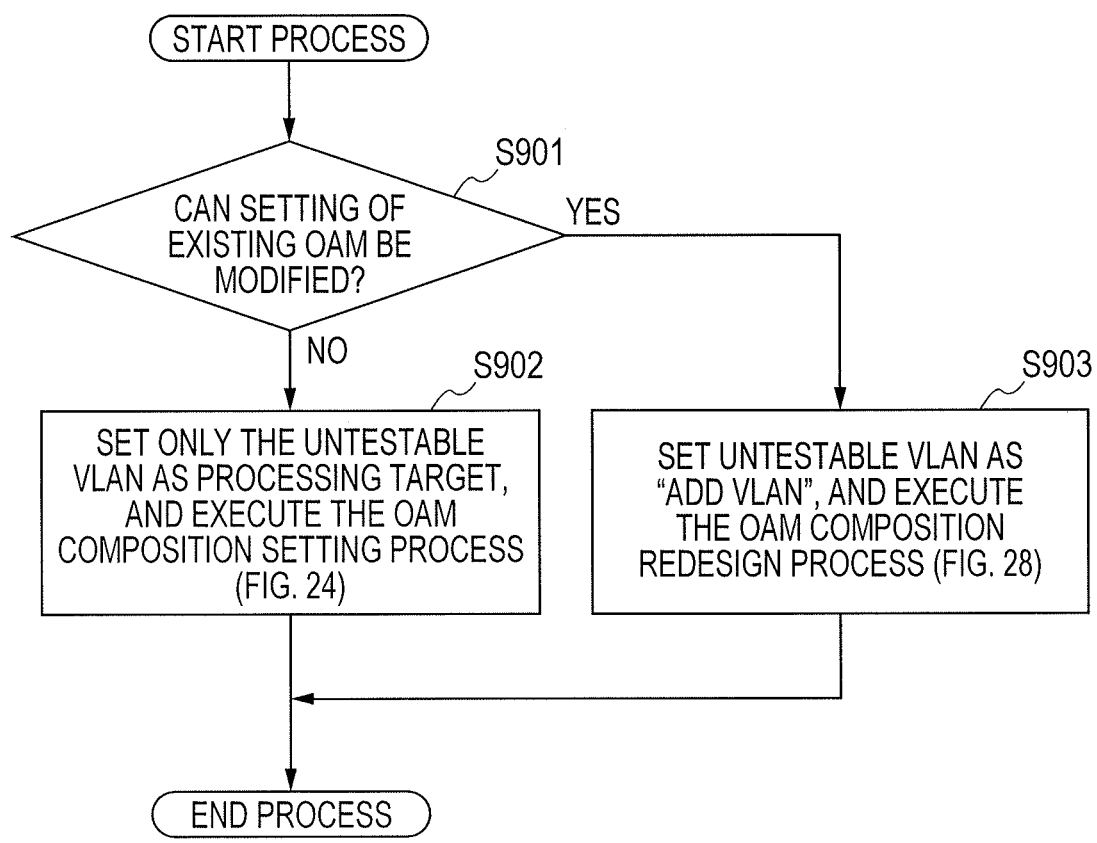
FIG. 39 is a flowchart of the OAM composition design process of the second embodiment.

FIG. 39 is a flowchart of the OAM composition design process of this embodiment. The management server 500 checks if the currently used OAM settings specified by the user can be modified (S901). If the OAM settings can be modified, then those VLAN that impossible to test are each set as "added VLAN", and the OAM composition redesign processing shown in FIG. 28 is performed (S903). If the modification is impossible, then the OAM composition design processing shown in FIG. 24 is performed only on the VLAN that are impossible to test (S902), and the process ends.

What is claimed is:

1. A network system comprising:
    a plurality of transfer devices to transfer packets; and
    a management server for managing virtual networks configured from the transfer devices, wherein:
    the management server includes:
        an interface to acquire network configuration information from the transfer devices, and
        a control unit to select a test target virtual network from the virtual networks; and
    the control unit:
        generates a plurality of virtual networks based on the configuration information;
        sorts the plurality of generated virtual networks into groups based on the transfer devices configuring the generated virtual networks and topology information for the transfer devices configuring the generated virtual networks;
        selects a virtual network from each of the groups, the selected virtual network being configured with a largest number of transfer devices;
        sets the selected virtual network as the test target virtual network in the group to which the selected virtual network belongs;
        calculates a redundant composition of the virtual network based on the configuration information; and
        sorts the virtual networks into groups based on the transfer devices that configure the transfer paths in the redundant composition and a physical topology table for the transfer devices that configure the transfer paths.

2. A network system comprising:
    a plurality of transfer devices to transfer packets; and
    a management server for managing virtual networks configured from the transfer devices, wherein:
    the management server includes:
        an interface to acquire network configuration information from the transfer devices, and
        a control unit to select a test target virtual network from the virtual networks; and
    the control unit:
        generates a plurality of virtual networks based on the configuration information;

sorts the plurality of generated virtual networks into groups based on the transfer devices configuring the generated virtual networks and topology information for the transfer devices configuring the generated virtual networks;

selects a virtual network from each of the groups, the selected virtual network being configured with a largest number of transfer devices; and sets the selected virtual network as the test target virtual network in the group to which the selected virtual network belongs; and if a communication failure is detected, each of the transfer devices in the test target virtual network sends a failure notification to the management server reporting that the communication failure has occurred, and the control unit:

specifies, from the received failure notification, the virtual network that is in the same group as the test target virtual network and contains the path on which the communication failure was detected, and generates a failure log relating to the test target virtual network and the specified virtual network.

3. A management server for managing virtual networks including a plurality of transfer devices to transfer packets, the management server comprising:

an interface to acquire network configuration information from the transfer devices, and a control unit to select a test target virtual network from the virtual networks; wherein the control unit:

generates a plurality of virtual networks based on the configuration information;

sorts the plurality of generated virtual networks into groups based on the transfer devices configuring the generated virtual networks and topology information for the transfer devices configuring the generated virtual networks;

selects a virtual network from each of the groups, the selected virtual network being configured with a largest number of transfer devices;

sets the selected virtual network as the test target virtual network in the group to which the selected virtual network belongs;

calculates a redundant composition of the virtual network based on the configuration information; and sorts the virtual network into groups based on the transfer devices that configure the transfer paths in the redundant composition and a physical topology table for the transfer devices that configure the transfer paths.

4. A management server for managing virtual networks including a plurality of transfer devices to transfer packets, the management server comprising:

an interface to acquire network configuration information from the transfer devices, and a control unit to select a test target virtual network from the virtual networks; wherein the control unit:

generates a plurality of virtual networks based on the configuration information;

sorts the plurality of generated virtual networks into groups based on the transfer devices configuring the generated virtual networks and topology information for the transfer devices configuring the generated virtual networks;

selects a virtual network from each of the groups, the selected virtual network being configured with a largest number of transfer devices; and sets the selected virtual network as the test target virtual network in the group to which the selected virtual network belongs;

wherein the interface receives a failure notification reporting a communication failure detected by a transfer device on the test target virtual network from the transfer device, and the control unit:

specifies, from the failure notification, the virtual network that is in the same group as the test target virtual network and contains the path on which the communication failure was detected, and generates a failure log relating to the test target virtual network and the specified virtual network.

5. An OAM test method for a management server to manage virtual networks configured from a plurality of transfer devices to transfer packets, the method comprising:

acquiring network configuration information from the transfer devices by way of an interface;

generating a plurality of virtual networks based on the configuration information;

sorting the plurality of generated virtual networks into groups based on the transfer devices configuring the generated virtual networks and topology information for the transfer devices configuring the generated virtual networks;

selecting one virtual network from each of the groups, the selected virtual network being configured with a largest number of transfer devices;

setting the selected virtual network as the test target virtual network in the group to which the selected virtual network belongs;

calculating a redundant composition of the virtual network based on the composition information; and sorting the virtual networks into groups based on the transfer devices that configure the transfer paths in the redundant composition and a physical topology table for the transfer devices that configure the transfer paths.

6. An OAM test method for a management server to manage virtual networks configured from a plurality of transfer devices to transfer packets, the method comprising:

acquiring network configuration information from the transfer devices by way of an interface;

generating a plurality of virtual networks based on the configuration information;

sorting the plurality of generated virtual networks into groups based on the transfer devices configuring the generated virtual networks and topology information for the transfer devices configuring the generated virtual networks;

selecting one virtual network from each of the groups, the selected virtual network being configured with a largest number of transfer devices;

setting the selected virtual network as the test target virtual network in the group to which the selected virtual network belongs;

receiving a failure notification reporting a communication failure detected by a transfer device on the test target virtual network from the transfer device;

specifying, from the failure notification, the virtual network that is in the same group as the test target virtual network and contains the path on which the communication failure was detected; and generating a failure log relating to the test target virtual network and the specified virtual network.

* * * * *